United States Patent
Dhatchinamoorthy et al.

(10) Patent No.: US 12,287,969 B2
(45) Date of Patent: Apr. 29, 2025

(54) DYNAMIC THROTTLING OF INPUT/OUTPUT QUEUES IN A DATA STORAGE DEVICE ARRAY

(71) Applicant: Western Digital Technologies, Inc., San Jose, CA (US)

(72) Inventors: Rahul Gandhi Dhatchinamoorthy, Bangalore (IN); Kumar Ranjan, Bangalore (IN); Senthil Kumar Veluswamy, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/364,723

(22) Filed: Aug. 3, 2023

(65) Prior Publication Data
US 2024/0393954 A1    Nov. 28, 2024

Related U.S. Application Data
(60) Provisional application No. 63/503,555, filed on May 22, 2023.

(51) Int. Cl.
G06F 3/06    (2006.01)

(52) U.S. Cl.
CPC .......... *G06F 3/0613* (2013.01); *G06F 3/0659* (2013.01); *G06F 3/0679* (2013.01)

(58) Field of Classification Search
CPC ....... G06F 3/06; G06F 13/404; G06F 13/4031
See application file for complete search history.

(56) References Cited

U.S. PATENT DOCUMENTS

| | | | |
|---|---|---|---|
| 9,372,631 B1 * | 6/2016 | Rozendorn | G06F 3/067 |
| 9,819,603 B2 | 11/2017 | Rector | |
| 9,824,048 B2 * | 11/2017 | Peng | G06F 13/4022 |
| 11,042,322 B2 | 6/2021 | Troy et al. | |
| 11,531,493 B2 | 12/2022 | Vansteenkiste et al. | |
| 2014/0331001 A1 * | 11/2014 | Liu | G06F 3/0659 |
| | | | 711/103 |
| 2020/0012451 A1 * | 1/2020 | Benisty | G06F 13/4282 |
| 2020/0104056 A1 * | 4/2020 | Benisty | G06F 3/0688 |
| 2021/0081235 A1 * | 3/2021 | Goto | G06F 9/4818 |

\* cited by examiner

*Primary Examiner* — Khoa D Doan
(74) *Attorney, Agent, or Firm* — Patent Law Works PLLC

(57) ABSTRACT

Systems and methods for dynamic throttling of input/output queues in data storage device arrays are described. Data storage devices are connected through the slots and corresponding lanes of a storage interface switch. A storage controller uses a delay inserted between host submission queues and backend submission queues to manage the priority of host storage commands using slot groups.

20 Claims, 9 Drawing Sheets

DYNAMIC THROTTLING OF INPUT/OUTPUT QUEUES IN A DATA STORAGE DEVICE ARRAY

TECHNICAL FIELD

The present disclosure generally relates to storage systems supporting a plurality of hosts and, more particularly, to dynamic allocation of storage resources in response to host requests.

BACKGROUND

Multi-device storage systems utilize multiple discrete data storage devices, generally disk drives (solid-state drives (SSD), hard disk drives (HDD), hybrid drives, tape drives, etc.) for storing large quantities of data. These multi-device storage systems are generally arranged in an array of drives interconnected by a common communication fabric and, in many cases, controlled by a storage controller, redundant array of independent disks (RAID) controller, or general controller, for coordinating storage and system activities across the array of drives. The data stored in the array may be stored according to a defined RAID level, a combination of RAID schemas, or other configurations for providing desired data redundancy, performance, and capacity utilization. In general, these data storage configurations may involve some combination of redundant copies (mirroring), data striping, and/or parity (calculation and storage), and may incorporate other data management, error correction, and data recovery processes, sometimes specific to the type of disk drives being used (e.g., solid-state drives versus hard disk drives).

There is an emerging trend in the storage industry to deploy disaggregated storage. Disaggregated storage brings significant cost savings via decoupling compute and storage node life cycles and allowing different nodes or subsystems to have different compute to storage ratios. In addition, disaggregated storage allows significant flexibility in migrating compute jobs from one physical server to another for availability and load balancing purposes.

Disaggregated storage has been implemented using a number of system architectures, including the passive Just-a-Bunch-of-Disks (JBOD) architecture, the traditional All-Flash Architecture (AFA), and Ethernet Attached Bunch of Flash (EBOF) disaggregated storage, which typically uses specialized chips to translate commands from external NVMe-OF (Non-Volatile Memory Express over Fabrics) protocol to internal NVMe (NVM Express) protocol. These architectures may be configured to support various Quality of Service (QOS) metrics and requirements to support host applications, often supporting a plurality of host systems with different workload requirements.

The systems may be deployed in data centers to support cloud computing services, such as platform as a service (PaaS), infrastructure as a service (IaaS), and/or software as a service (SaaS). Data centers and their operators may offer defined (and sometime contractually guaranteed) QoS with responsive, on-demand provisioning of both hardware and software resources in multi-tenant systems. Various schemes for dynamic resource allocation may be used at different levels of the system hierarchies and roles. Prior resource allocation schemes may not provide optimal allocation of non-volatile memory resources among a plurality of hosts with differing workloads in a multi-tenant system.

In some architectures, such as NVMe, host storage connections may be established with individual data storage devices through a fabric network based on a request system that allocates processing queues, such as NVMe queue-pairs, to the host storage connections on a one-to-one basis. Once host storage connection to a particular namespace and backend storage device is established, the storage system may have limited control over incoming submission queue requests from the hosts, which may lead to bottlenecking and misallocation of resources, particularly across the devices and physical interface structure (slots and lanes) within a just-a-bunch-of-flash (JBOF) enclosure.

Therefore, there still exists a need for storage systems with flexible and dynamic resource allocation configurations for back-end non-volatile memory resources.

SUMMARY

Various aspects for dynamic throttling of input/output queues in data storage device arrays are described. More particularly, a storage controller associated with an interface switch may insert a delay between host queues and backend queues to enforce one or more defined priority schemes.

One general aspect includes a system that includes a processor; a memory; a storage interface switch configured to communicate with a plurality of data storage devices, where each data storage device of the plurality of data storage devices is configured to connect to the storage interface switch through a corresponding slot of a plurality of slots and each slot of the plurality of slots is configured to receive host storage commands through a corresponding set of lanes for that slot; a host interface configured to communicate with a plurality of host devices; and a connection manager configured to: receive, though the host interface, the host storage commands to a plurality of host submission queues allocated to a plurality of host connections for a plurality of namespaces allocated in the plurality of data storage devices; and forward the host storage commands to a plurality of backend submission queues for the corresponding namespaces of the plurality of namespaces. The system also includes a throttling engine configured to: determine priority among a set of pending host storage commands received to host submission queues; and insert, prior to forwarding a pending host storage command from the set of pending host storage commands, a delay based on the priority.

Implementations may include one or more of the following features. The system may include a priority lookup data structure configured to map a set of index values to a corresponding set of priority allocations, where the throttling engine is further configured to: determine, for each host storage command in the set of pending host storage commands, a corresponding index value from the set of index values; and determine, based on the corresponding index value for each host storage command in the set of pending host storage commands, the delay for that host storage command. The set of index values may correspond to a set of slot groups where each slot of the plurality of slots is allocated to a slot group from the set of slot groups; and the priority lookup data structure may be further configured to map each slot group in the set of slot groups to a priority value for that slot group from the corresponding set of priority allocations. Mapping each slot group in the set of slot groups may include mapping each slot group to a priority group selected from: a plurality of host priority groups for the plurality of host devices and corresponding to groups of host identifiers assigned to different priority levels; a plurality of namespace priority groups for the plurality of namespaces and corresponding to groups of namespace identifiers assigned to different priority levels; or a plurality of data storage device priority groups for the plurality of data storage devices and corresponding to groups of data storage device identifiers assigned to different priority levels. The priority values for the set of slot groups may each allocate a portion of a total bandwidth value of host storage commands to be processed; a sum of the priority values for the set of slot groups may equal a total bandwidth value; and the throttling engine may be further configured to determine the delay for each host storage command based on the priority value and a number of pending host storage commands corresponding to that slot group. The priority values for the set of slot groups may each allocate that slot group to an ordinal priority; and the throttling engine may be further configured to determine the delay for each host storage command based on the priority value and a number of pending host storage operations corresponding to that slot group and any slot group with a higher priority value. The throttling engine may be further configured to: monitor lane input/output traffic between the storage interface switch and the plurality of data storage devices; and determine, based on the lane traffic, the priority value for each slot group. The throttling engine may be further configured to: monitor host input/output traffic between the host devices and the plurality of host submission queues; and determine, based on the host input/output traffic, the priority value for each slot group. The throttling engine may be further configured to: determine a recurring operating window for determining the set of pending host storage commands; and determine the delay for each pending host storage command of the set of pending host storage commands for each cycle of the recurring operating window. The throttling engine may include a token bucket engine configured to: generate a set of tokens for each cycle of the recurring operating window; allocate, based on the priority of each slot group of a set of slot groups for the plurality of slots, the set of tokens across the set of slot groups; and determine, based on the set of pending host storage commands and tokens available for a corresponding slot group from the set of slot groups, the delay for each pending host storage command.

Another general aspect includes a computer-implemented method that includes: receiving, though a host interface, host storage commands to a plurality of host submission queues allocated to a plurality of host connections for a plurality of namespaces allocated in a plurality of data storage devices; forwarding the host storage commands to a plurality of backend submission queues for the corresponding namespaces of the plurality of namespaces, where the plurality of data storage devices is accessed through a storage interface switch, each data storage device of the plurality of data storage devices is configured to connect to the storage interface switch through a corresponding slot of a plurality of slots, and each slot of the plurality of slots is configured to receive corresponding host storage commands through a corresponding set of lanes for that slot; determining priority among a set of pending host storage commands received to host submission queues; inserting, prior to forwarding a pending host storage command from the set of pending host storage commands, a delay based on the priority; and executing, from the plurality of backend submission queues, the host storage commands using the plurality of data storage devices.

Implementations may include one or more of the following features. The computer-implemented method may include: mapping, using a priority lookup data structure, a set of index values to a corresponding set of priority allocations; determining, for each host storage command in the set of pending host storage commands, a corresponding index value from the set of index values; and determining, based on the corresponding index value for each host storage command in the set of pending host storage commands, the delay for that host storage command. The computer-implemented method may include mapping, by the priority lookup data structure, each slot group in a set of slot groups to a priority value for that slot group from the corresponding set of priority allocations, where the set of index values correspond to the set of slot groups and each slot of the plurality of slots is allocated to a slot group from the set of slot groups. The computer-implemented method may include determining the delay for each host storage command based on the priority value and a number of pending host storage commands corresponding to that slot group, where the priority values for the set of slot groups each allocate a portion of a total bandwidth value of host storage commands to be processed and a sum of the priority values for the set of slot groups equals a total bandwidth value. The computer-implemented method may include determining the delay for each host storage command based on the priority value and a number of pending host storage operations corresponding to that slot group and any slot group with a higher priority value, where priority values for the set of slot groups each allocate that slot group to an ordinal priority. The computer-implemented method may include: monitoring lane input/output traffic between the storage interface switch and the plurality of data storage devices; and determining, based on the lane input/output traffic, the priority value for each slot group. The computer-implemented method may include: monitoring host input/output traffic between host devices and the plurality of host submission queues; and determining, based on the host input/output traffic, the priority value for each slot group. The computer-implemented method may include: determining a recurring operating window for determining the set of pending host storage commands; and determining the delay for each pending host storage command of the set of pending host storage commands for each cycle of the recurring operating window. The computer-implemented method may include: generating a set of tokens for each cycle of the recurring operating window; allocating, based on the priority of each slot group of a set of slot groups for the plurality of slots, the set of tokens across the set of slot groups; and determining, based on the set of pending host storage commands and tokens available for a corresponding slot group from the set of slot groups, the delay for each pending host storage command.

Still another general aspect includes a storage system including: a processor; a memory; a plurality of data storage devices; a storage interface switch configured to communicate with the plurality of data storage devices, where each data storage device of the plurality of data storage devices is configured to connect to the storage interface switch through a corresponding slot of a plurality of slots, and each slot of the plurality of slots is configured to receive host storage commands through a corresponding set of lanes for that slot; a host interface configured to communicate with a plurality of host devices; means for receiving, though the host interface, host storage commands to a plurality of host submission queues allocated to a plurality of host connections for a plurality of namespaces allocated in the plurality of data storage devices; means for forwarding the host storage commands to a plurality of backend submission queues for the corresponding namespaces of the plurality of namespaces; means for determining priority among a set of pending host storage commands received to host submission queues; means for inserting, prior to forwarding a pending host storage command from the set of pending host storage commands, a delay based on the priority; and means for executing, from the plurality of backend submission queues, the host storage commands using the plurality of data storage devices.

The various embodiments advantageously apply the teachings of data storage devices and/or multi-device storage systems to improve the functionality of such computer systems. The various embodiments include operations to overcome or at least reduce the issues previously encountered in storage arrays and/or systems and, accordingly, are more reliable and/or efficient than other computing systems. That is, the various embodiments disclosed herein include hardware and/or software with functionality to improve shared access to non-volatile memory resources by host systems in multi-tenant storage systems, such as by using a delay between host queues and backend queues to support slot-level priority control. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

BRIEF DESCRIPTION OF THE DRAWINGS

FIG. 6b is a flowchart of an example method of using a delay based on slot groups with the method of FIG. 6a.

FIG. 6C is a flowchart of an example method of using a delay based on host groups and strict priority with the method of FIG. 6a.

FIG. 6d is a flowchart of an example method of using a delay based on monitoring storage interface lanes with the method of FIG. 6a.

DETAILED DESCRIPTION

Figure 1:
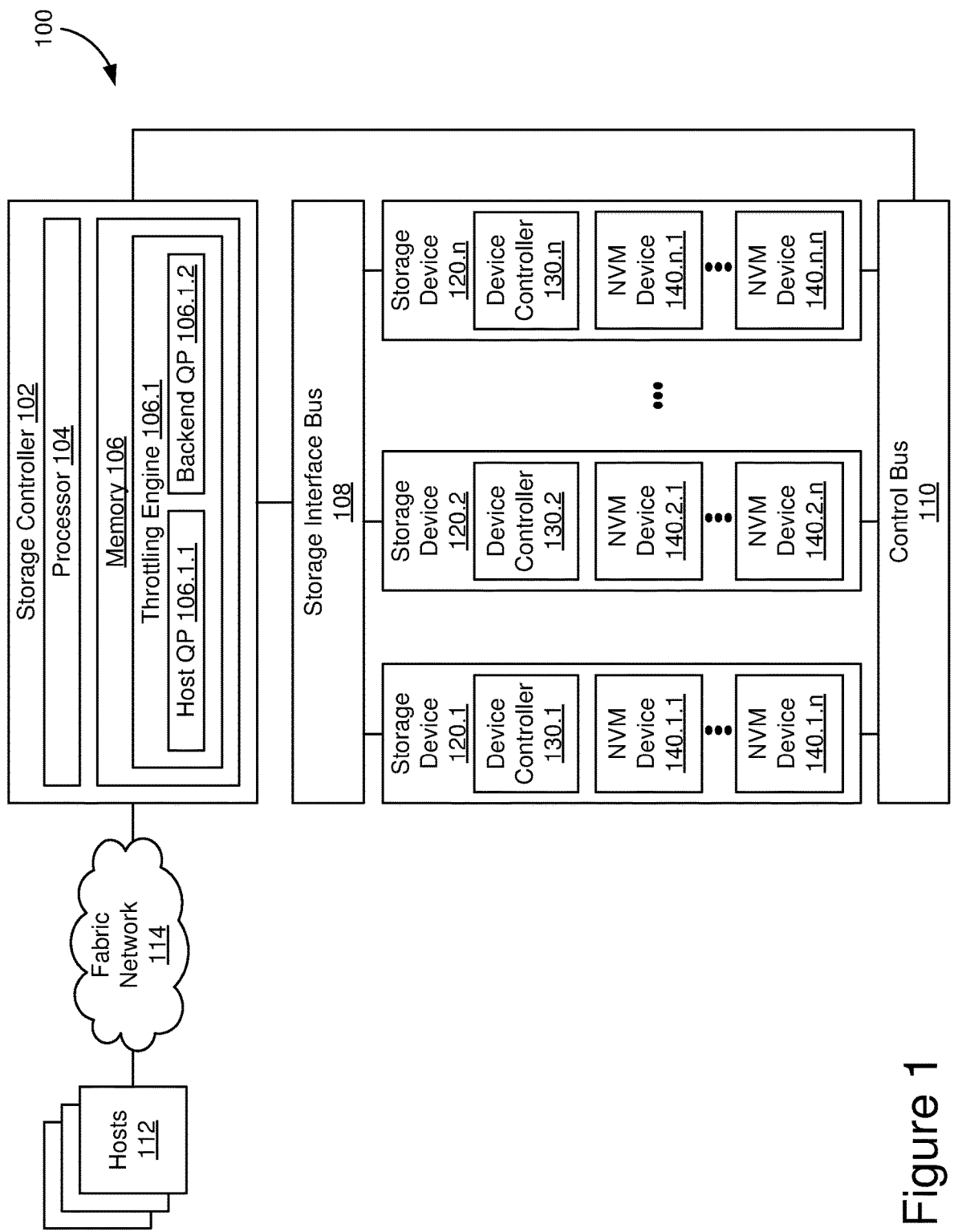
FIG. 1 schematically illustrates a multi-device storage system supporting a plurality of host systems.

FIG. 1 shows an embodiment of an example data storage system 100 with multiple data storage devices 120 supporting a plurality of host systems 112 through storage controller 102. While some example features are illustrated, various other features have not been illustrated for the sake of brevity and so as not to obscure pertinent aspects of the example embodiments disclosed herein. To that end, as a non-limiting example, data storage system 100 may include one or more data storage devices 120 (also sometimes called information storage devices, storage devices, disk drives, or drives) configured in a storage node with storage controller 102. In some embodiments, storage devices 120 may be configured in a server, storage array blade, all flash array appliance, or similar storage unit for use in data center storage racks or chassis. Storage devices 120 may interface with one or more host nodes or host systems 112 and provide data storage and retrieval capabilities for or through those host systems. In some embodiments, storage devices 120 may be configured in a storage hierarchy that includes storage nodes, storage controllers (such as storage controller 102), and/or other intermediate components between storage devices 120 and host systems 112. For example, each storage controller 102 may be responsible for a corresponding set of storage devices 120 in a storage node and their respective storage devices may be connected through a corresponding backplane network or internal bus architecture including storage interface bus 108 and/or control bus 110, though only one instance of storage controller 102 and corresponding storage node components are shown. In some embodiments, storage controller 102 may include or be configured within a host bus adapter for connecting storage devices 120 to fabric network 114 for communication with host systems 112.

In the embodiment shown, a number of storage devices 120 are attached to a common storage interface bus 108 for host communication through storage controller 102. For example, storage devices 120 may include a number of drives arranged in a storage array, such as storage devices sharing a common rack, unit, or blade in a data center or the SSDs in an all flash array. In some embodiments, storage devices 120 may share a backplane network, network switch(es), and/or other hardware and software components accessed through storage interface bus 108 and/or control bus 110. For example, storage devices 120 may connect to storage interface bus 108 and/or control bus 110 through a plurality of physical port connections that define physical, transport, and other logical channels for establishing communication with the different components and subcomponents for establishing a communication channel to host 112. In some embodiments, storage interface bus 108 may provide the primary host interface for storage device management and host data transfer, and control bus 110 may include limited connectivity to the host for low-level control functions.

In some embodiments, storage devices 120 may be referred to as a peer group or peer storage devices because they are interconnected through storage interface bus 108 and/or control bus 110. In some embodiments, storage devices 120 may be configured for peer communication among storage devices 120 through storage interface bus 108, with or without the assistance of storage controller 102 and/or host systems 112. For example, storage devices 120 may be configured for direct memory access using one or more protocols, such as non-volatile memory express (NVMe), remote direct memory access (RDMA), NVMe over fabric (NVMeOF), etc., to provide command messaging and data transfer between storage devices using the high-bandwidth storage interface and storage interface bus 108.

In some embodiments, data storage devices 120 are, or include, solid-state drives (SSDs). Each data storage device 120.1-120.n may include a non-volatile memory (NVM) or device controller 130 based on compute resources (processor and memory) and a plurality of NVM or media devices 140 for data storage (e.g., one or more NVM device(s), such as one or more flash memory devices). In some embodiments, a respective data storage device 120 of the one or more data storage devices includes one or more NVM controllers, such as flash controllers or channel controllers (e.g., for storage devices having NVM devices in multiple memory channels). In some embodiments, data storage devices 120 may each be packaged in a housing, such as a multi-part sealed housing with a defined form factor and ports and/or connectors for interconnecting with storage interface bus 108 and/or control bus 110.

In some embodiments, a respective data storage device 120 may include a single medium device while in other embodiments the respective data storage device 120 includes a plurality of media devices. In some embodiments, media devices include NAND-type flash memory or NOR-type flash memory. In some embodiments, data storage device 120 may include one or more hard disk drives (HDDs). In some embodiments, data storage devices 120 may include a flash memory device, which in turn includes one or more flash memory die, one or more flash memory packages, one or more flash memory channels or the like. However, in some embodiments, one or more of the data storage devices 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 120 includes a device controller 130, which includes one or more processing units (also sometimes called central processing units (CPUs), processors, microprocessors, or microcontrollers) configured to execute instructions in one or more programs. In some embodiments, the one or more processors are shared by one or more components within, and in some cases, beyond the function of the device controllers. In some embodiments, device controllers 130 may include firmware for controlling data written to and read from media devices 140, one or more storage (or host) interface protocols for communication with other components, as well as various internal functions, such as garbage collection, wear leveling, media scans, and other memory and data maintenance. For example, device controllers 130 may include firmware for running the NVM layer of an NVMe storage protocol alongside media device interface and management functions specific to the storage device. Media devices 140 are coupled to device controllers 130 through connections that typically convey commands in addition to data, and optionally convey metadata, error correction information and/or other information in addition to data values to be stored in media devices and data values read from media devices 140. Media devices 140 may include any number (i.e., one or more) of memory devices including, without limitation, non-volatile semiconductor memory devices, such as flash memory device(s).

In some embodiments, media devices 140 in storage devices 120 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 120 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 120, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, files, or other logical data constructs composed of multiple host blocks.

In some embodiments, storage controller 102 may be coupled to data storage devices 120 through a network interface that is part of host fabric network 114 and includes storage interface bus 108 as a host fabric interface. In some embodiments, host systems 112 are coupled to data storage system 100 through fabric network 114 and storage controller 102 may include a storage network interface, host bus adapter, or other interface capable of supporting communications with multiple host systems 112. Fabric network 114 may include a wired and/or wireless network (e.g., public and/or private computer networks in any number and/or configuration) which may be coupled in a suitable way for transferring data. For example, the fabric network may include any means of a conventional data communication network such as a local area network (LAN), a wide area network (WAN), a telephone network, such as the public switched telephone network (PSTN), an intranet, the internet, or any other suitable communication network or combination of communication networks. From the perspective of storage devices 120, storage interface bus 108 may be referred to as a host interface bus and provides a host data path between storage devices 120 and host systems 112, through storage controller 102 and/or an alternative interface to fabric network 114.

Host systems 112, or a respective host in a system having multiple hosts, may be any suitable computer device, such as a computer, a computer server, a laptop computer, a tablet device, a netbook, an internet kiosk, a personal digital assistant, a mobile phone, a smart phone, a gaming device, or any other computing device. Host systems 112 are sometimes called a host, client, or client system. In some embodiments, host systems 112 are server systems, such as a server system in a data center. In some embodiments, the one or more host systems 112 are one or more host devices distinct from a storage node housing the plurality of storage devices 120 and/or storage controller 102. In some embodiments, host systems 112 may include a plurality of host systems owned, operated, and/or hosting applications belonging to a plurality of entities and supporting one or more quality of service (QOS) standards for those entities and their applications. Host systems 112 may be configured to store and access data in the plurality of storage devices 120 in a multi-tenant configuration with shared storage resource pools, such as host connections to namespaces defined in storage devices 120.

Storage controller 102 may include one or more central processing units (CPUs) or processors 104 for executing compute operations, storage management operations, and/or instructions for accessing storage devices 120 through storage interface bus 108. In some embodiments, processors 104 may include a plurality of processor cores which may be assigned or allocated to parallel processing tasks and/or processing threads for different storage operations and/or host storage connections. In some embodiments, processor 104 may be configured to execute fabric interface for communications through fabric network 114 and/or storage interface protocols for communication through storage interface bus 108 and/or control bus 110. In some embodiments, a separate network interface unit and/or storage interface unit (not shown) may provide the network interface protocol and/or storage interface protocol and related processor and memory resources.

Storage controller 102 may include a memory 106 configured to support a throttling engine 106.1 that operates on or between host queue pairs 106.1.1 and backend queue pairs 106.1.2. For example, host queue pairs 106.1.1 may include submission and completion queues that are allocated to host connections for enabling direct memory access by hosts 112 and backend queue pairs 106.1.2 may include submission and completion queues that are allocated to a storage device containing a defined namespace accessible to that host. Throttling engine 106.1 may selectively insert a delay between host queue pairs 106.1.1 and corresponding backend queue pairs 106.1.2 to give priority to different paths through storage interface bus 108. In some embodiments, storage controller 102 may include a storage interface switch that controls the lanes and slots that connect storage interface bus 108 to respective storage devices 120. Throttling engine 106.1 may use the configuration of slots to manage the priority and dynamic allocation of host input/output (I/O) operations to storage devices 120. In some embodiments, memory 106 may include one or more dynamic random access memory (DRAM) devices for use by storage devices 120 for command, management parameter, and/or host data storage and transfer. In some embodiments, storage devices 120 may be configured for direct memory access (DMA), such as using remote direct memory access (RDMA) protocols, over storage interface bus 108.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

Figure 2:
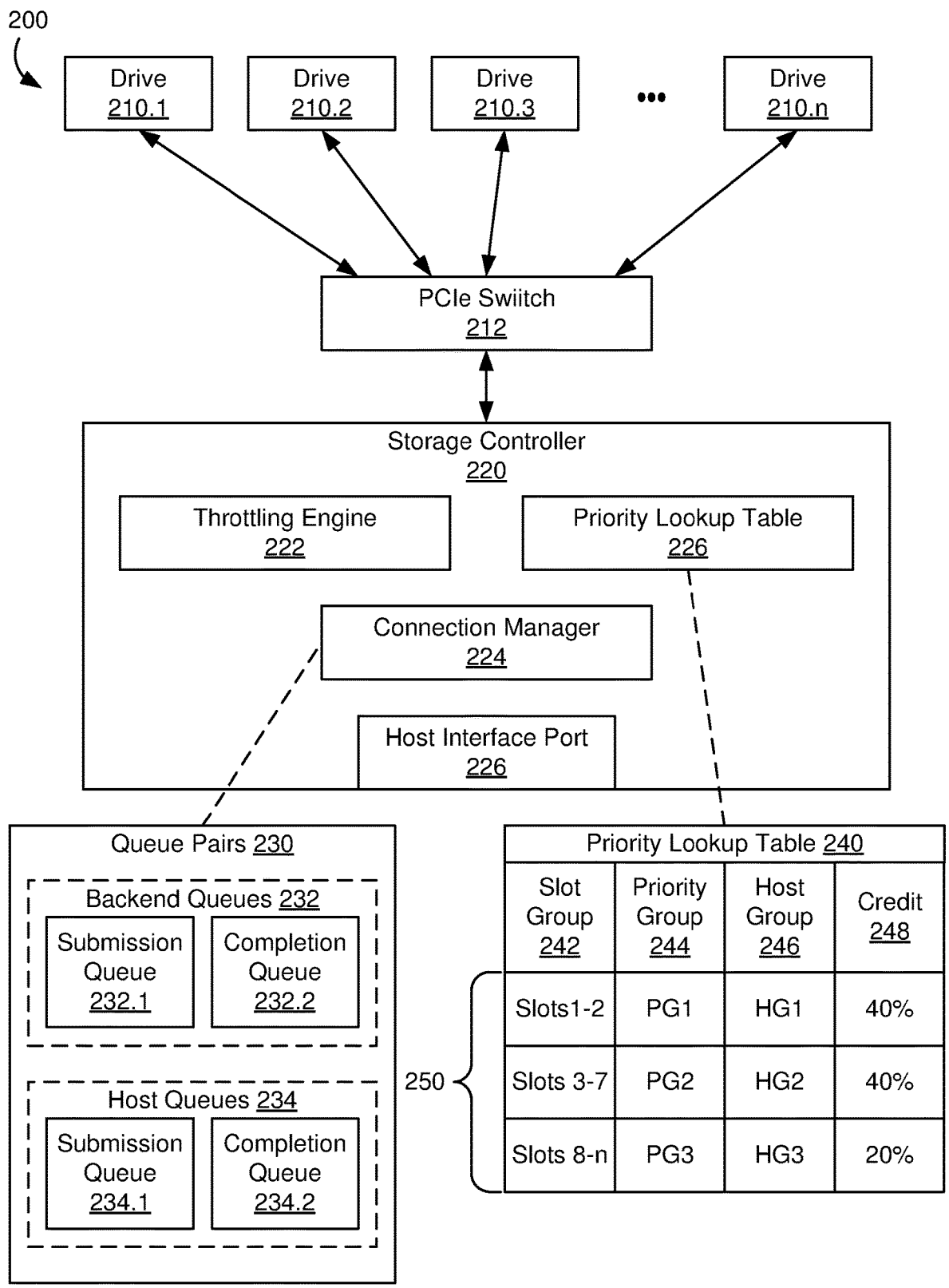
FIG. 2 schematically illustrates an example storage system for inserting prioritized delays between host and backend queue-pairs.

FIG. 2 shows schematic representations of an example storage system 200, such as an all flash array or JBOF enclosure using NVMe and PCIe interface protocols. In some configurations, storage system 200 may be configured similarly to multi-device storage system 100 in FIG. 1. Storage system 200 may include a plurality of drives 210.1-210.n, such as SSDs or other data storage devices, that are connected to a storage interface switch, such as PCIe switch 212. Storage system 200 may define a plurality of physical slots into which each drive 210 is inserted and including a physical storage interface for connecting the drive to PCIe switch 212 over a storage interface bus. In some configurations, each slot may be supported by one or more lanes through the storage interface bus comprised of conductors (e.g., wires or traces) for transporting electrical signals and corresponding digital information between storage controller 220 and drives 210. PCIe switch 212 may also support a switch/controller interface comprised of a number of lanes for communication with storage controller 220. PCIe switch 212 may support a larger number of total lanes to drives 210 than lanes to storage controller 220. For example, PCIe switch 212 may be configured to support 2 lane connections to each storage device 120 and include 24 drives in an array, resulting in 48 lanes of drive connections, while the storage controller interface may only support 16 lanes. In some configurations, PCIe switch 212 may be a possible bottleneck within storage system 200 and may also provide an opportunity to dynamically allocate the switch bandwidth based on slots to achieve service-level, wear management, and load balancing goals. In some configurations, other interface protocols than PCIe may be used and/or other interface and lane configurations, such as 4 or more lanes per drive or 32 or more lanes to storage controller 220.

Storage controller 220 may be configured as described above for storage controller 102 and include a processor and memory configured to execute software and/or hardware logic configured in one or more functional modules. In some configurations, storage controller 220 may include a throttling engine 222 configured to determine and insert a delay for connection manager 224. Connection manager 224 may be configured to manage host connections to host queue pairs and backend connections between backend queue pairs and corresponding storage devices, as well as command forwarding (and selective delays from throttling engine 222) between host and backend queue pairs. In some configurations, throttling engine 222 may use a priority lookup data structure, such as priority lookup table 226, to determine the relative priority and resulting delay based on the current load of host storage commands. Storage controller 220 may also include a host interface port for receiving communication, including host storage commands, from the host systems. In some configurations, storage controller 220 and PCIe switch 212 may be embodied in packages, such as systems on a chip (SOCs), application specific integrated circuits (ASICs), field programmable gate arrays (FPGAs), central processing units (CPUs), etc., on a common printed circuit board assembly (PCBA) with a shared interface bus between them.

Connection manager 224 may receive host connection requests for a requested namespace, allocate a queue pair from backend queues 232 to connect with a drive hosting the namespace, and allocate a queue pair for host queues 234 to receive subsequent host storage commands. Connection manager 224 may simultaneously manage connections to queue pairs 230 from a plurality of host systems to a plurality of namespaces distributed among drives 210. Connection manager 224 may be configured to support a fixed number of queue pairs 230 for access to drives 210 and allocate them in response to connection requests from the supported host systems. In some configurations, connection manager 224 may maintain a one-to-one mapping of connection identifiers, backend queues 232 and host queues 234. For example, host storage commands directed to a particular connection identifier may be directed to a corresponding host submission queue 234.1 and forwarded by connection manager 224 to the allocated backend submission queue 232.1 for that connection identifier. Similarly, results of the storage commands may be returned to the allocated backend completion queue 232.2 and forwarded by connection manager 224 to the corresponding host completion queue for that connection identifier.

Rather than forwarding each host storage command from host submission queue 234.1 to backend submission queue 232.1 as it is received, connection manager 224 may interface with throttling engine 222 to determine whether a delay should be applied to forwarding the host storage command between the host and backend submission queues. For example, within an operating window, throttling engine 222 may determine whether resources are available for a particular host storage command based on one or more prioritization schemes and either allow the host storage command to forward to the backend submission queue or insert a delay that prevents the host storage command from being forwarded. In some configurations, a token bucket algorithm may be used to balance available bandwidth across resource or priority groups. In some configurations, an ordinal priority scheme may be used to provide strict priority to selected resource or priority groups. Throttling engine 222 may use the slots of the storage interface for drives 210, as defined by the lanes through PCIe switch 212, to group and allocate resources by priority.

Throttling engine 222 may use priority lookup table 240 to configure and determine priority allocations across priority groups. For example, priority groups may be defined in terms of the slots corresponding to group of resources being prioritized. For example, priority lookup table 240 may group slots in a slot group column 242 and use a plurality of table entries 250 to define different slot groups, such as slots 1-2 (Group A), slots 3-7 (Group B), and slots 8-n (Group C). Each slot group may correspond to a priority value in priority lookup table 240 to allocate resources by priority. For example, credit column 248 may correspond to a share or portion of tokens allocated to the different slot groups. So, Group A may have a priority value of 40% (which represents the highest priority allocation in the example table, since it is shared across only two slots), Group B may have a priority value of 40% (but shared across 5 slots), and Group C may have a priority value of 20% (allocated across the remaining slots, such as 9 slots in a 16 slot configuration or 25 slots in a 32 slot configuration). In some configurations, slot groups may be mapped to other priority group identifiers, such as a namespace priority group 244 or host priority group 246. Such mappings may allow slot groups and corresponding priority values in the table to be indexed by other values, such as a group of namespace identifiers or a group of host identifiers. These priority groups may make it easier for hosts or system admins without direct knowledge of the slot assignments to prioritize how slot/switch traffic is prioritized or allocated. In some configurations, slot identifiers or storage device identifiers allocated to slots may be used as index values for determining which priority group a host storage command belongs to and throttling engine 222 may use the backend storage device identifier corresponding to the host connection of the storage command to determine which slot group the command is assigned to. A namespace priority group may use the namespace identifier from the storage command and a host priority group may use the host identifier from the storage command as index values for determining which slot group and priority allocation the storage command receives. Various methods for determining the delay based on the slot group and priority allocations in priority lookup table 240 are further described below.

Figure 3:
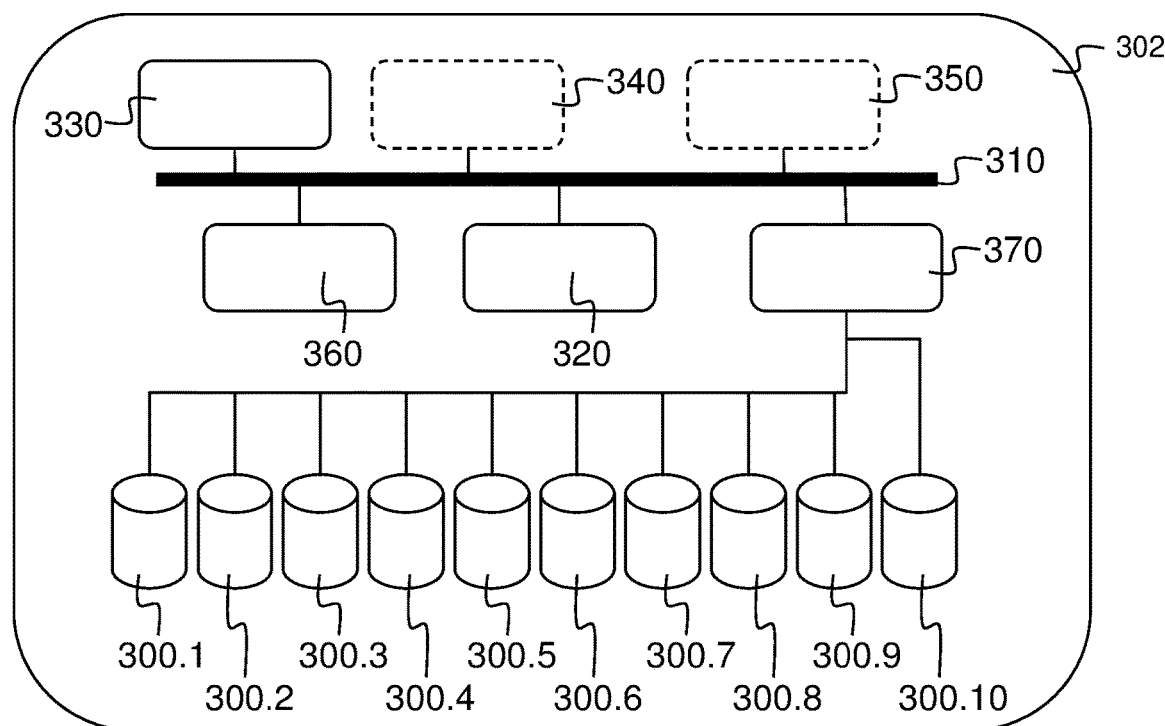
FIG. 3 schematically illustrates a storage node of the multi-device storage system of FIG. 1.

FIG. 3 shows a schematic representation of a storage node 302. For example, storage controller 102 may be configured as a storage node 302 for accessing storage devices 120 as storage elements 300. Storage node 302 may comprise a bus 310, a storage node processor 320, a storage node memory 330, one or more optional input units 340, one or more optional output units 350, a communication interface 360, a storage element interface 370 and a plurality of storage elements 300.1-300.10. In some embodiments, at least portions of bus 310, processor 320, local memory 330, communication interface 360, storage element interface 370 may comprise a storage controller, backplane management controller, network interface controller, or host bus interface controller, such as storage controller 102. Bus 310 may include one or more conductors that permit communication among the components of storage node 302. Processor 320 may include any type of conventional processor or microprocessor that interprets and executes instructions. Local memory 330 may include a random-access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to said storage node 302, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 302 to communicate with other devices and/or systems, for example mechanisms for communicating with other storage nodes 302 or host systems 112. Storage element interface 370 may comprise a storage interface, such as a Serial Advanced Technology Attachment (SATA) interface, a Small Computer System Interface (SCSI), peripheral computer interface express (PCIe), etc., for connecting bus 310 to one or more storage elements 300, such as one or more storage devices 120, for example, 2 terabyte (TB) NVMe solid state drives (SSDs), and control the reading and writing of data to/from these storage elements 300. As shown in FIG. 3, such a storage node 302 could comprise ten 2 TB NVMe disk drives as storage elements 300.1-300.10 and, in this way, storage node 302 would provide a storage capacity of 20 TB to the storage system 100.

Storage elements 300 may be configured as redundant or operate independently of one another. In some configurations, if one particular storage element 300 fails its function can easily be taken on by another storage element 300 in the storage system. Furthermore, the independent operation of the storage elements 300 allows to use any suitable mix of types storage elements 300 to be used in a particular storage system 100. It is possible to use for example storage elements with differing storage capacity, storage elements of differing manufacturers, using different hardware technology such as for example conventional hard disks and solid-state storage elements, using different storage interfaces, and so on. All this results in specific advantages for scalability and flexibility of storage system 100 as it allows to add or remove storage elements 300 without imposing specific requirements to their design in correlation to other storage elements 300 already in use in that storage system 100.

Figure 4:
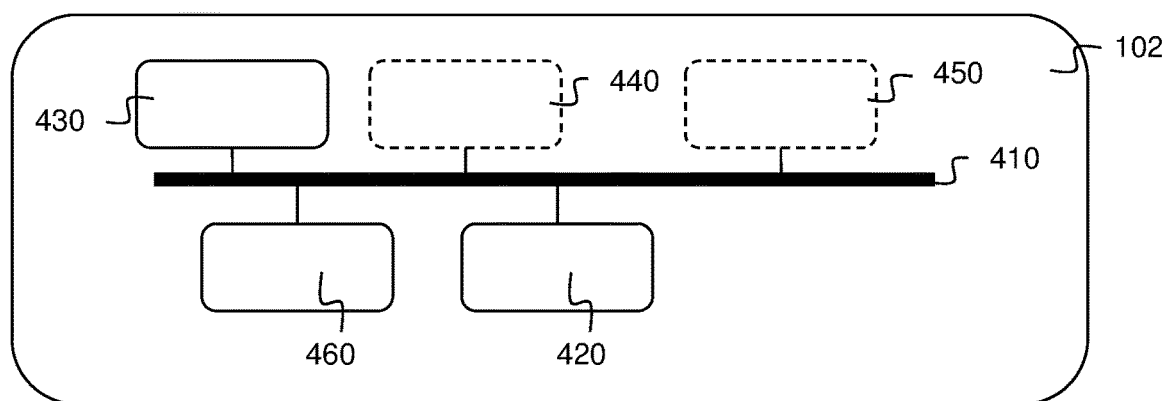
FIG. 4 schematically illustrates a host node of the multi-device storage system of FIG. 1.

FIG. 4 shows a schematic representation of an example host system 112. Host system 112 may comprise a bus 410, a processor 420, a local memory 430, one or more optional input units 440, one or more optional output units 450, and a communication interface 460. Bus 410 may include one or more conductors that permit communication among the components of host 112. Processor 420 may include any type of conventional processor or microprocessor that interprets and executes instructions. Local memory 430 may include a random access memory (RAM) or another type of dynamic storage device that stores information and instructions for execution by processor 420 and/or a read only memory (ROM) or another type of static storage device that stores static information and instructions for use by processor 420 and/or any suitable storage element such as a hard disc or a solid state storage element. An optional input unit 440 may include one or more conventional mechanisms that permit an operator to input information to host 112 such as a keyboard, a mouse, a pen, voice recognition and/or biometric mechanisms, etc. Optional output unit 450 may include one or more conventional mechanisms that output information to the operator, such as a display, a printer, a speaker, etc. Communication interface 460 may include any transceiver-like mechanism that enables host 112 to communicate with other devices and/or systems.

Figure 5:
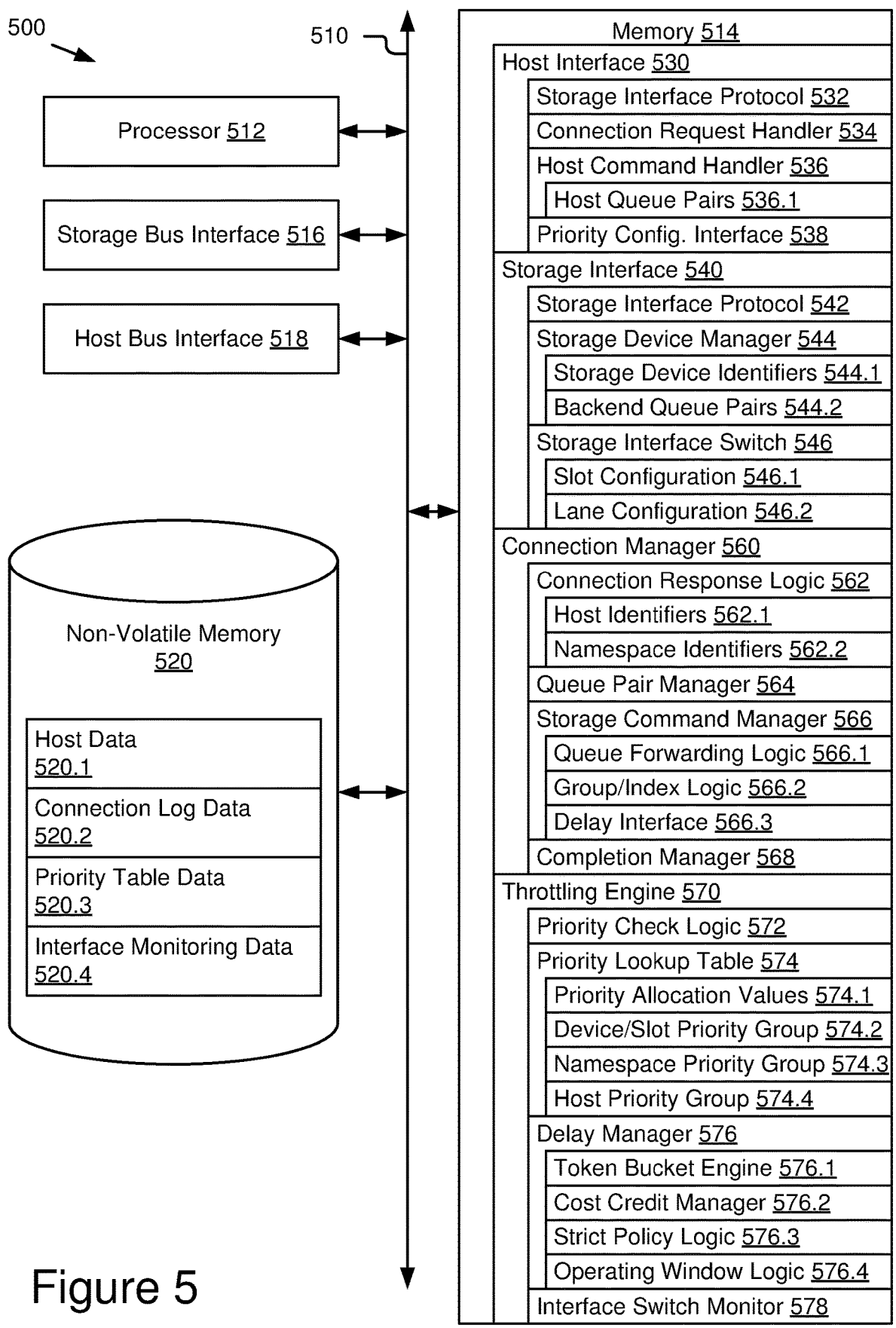
FIG. 5 schematically illustrates some elements of the storage node of FIG. 1-3 in more detail.

FIG. 5 schematically shows selected modules of a storage node 500 configured for connection virtualization. Storage node 500 may incorporate elements and configurations similar to those shown in FIGS. 1-3. For example, storage node 500 may be configured as storage controller 102 and a plurality of storage devices 120 supporting host connection requests and storage operations from host systems 112 over fabric network 114.

Storage node 500 may include a bus 510 interconnecting at least one processor 512, at least one memory 514, and at least one interface, such as storage bus interface 516 and host bus interface 518. Bus 510 may include one or more conductors that permit communication among the components of storage node 500. Processor 512 may include any type of processor or microprocessor that interprets and executes instructions or operations. Memory 514 may include a random access memory (RAM) or another type of dynamic storage device that stores information and instructions for execution by processor 512 and/or a read only memory (ROM) or another type of static storage device that stores static information and instructions for use by processor 512 and/or any suitable storage element such as a hard disk or a solid state storage element.

Storage bus interface 516 may include a physical interface for connecting to one or more data storage devices using an interface protocol that supports storage device access. For example, storage bus interface 516 may include a PCIe or similar storage interface connector supporting NVMe access to solid state media comprising non-volatile memory devices 520. In some configurations, storage bus interface may connect storage interface switch 546 to a plurality of slots using two or more lanes per slot. Host bus interface 518 may include a physical interface for connecting to one or more host nodes, generally via a network interface. For example, host bus interface 518 may include an ethernet connection to a host bus adapter, network interface, or similar network interface connector supporting NVMe host connection protocols, such as RDMA and TCP/IP connections. In some embodiments, host bus interface 518 may support NVMeoF or similar storage interface protocols.

Storage node 500 may include one or more non-volatile memory devices 520 or similar storage elements configured to store host data. For example, non-volatile memory devices 520 may include a plurality of SSDs or flash memory packages organized as an addressable memory array. In some embodiments, non-volatile memory devices 520 may include NAND or NOR flash memory devices comprised of single level cells (SLC), multiple level cell (MLC), triple-level cells, quad-level cells, etc. In some configurations, non-volatile memory devices 520 may include storage controller memory devices supporting memory 514 and/or allocated for system use in one or more of the attached SSDs.

Storage node 500 may include a plurality of modules or subsystems that are stored and/or instantiated in memory 514 for execution by processor 512 as instructions or operations. For example, memory 514 may include a host interface 530 configured to receive, process, and respond to host connection and data requests from client or host systems. Memory 514 may include a storage interface 540 configured to manage read and write operations to non-volatile memory devices 520. Memory 514 may include a connection manager 560 configured to provide host connection and queue pair management for both host-side and backend queue pairs. Memory 514 may include a throttling engine 570 configured to determine priority allocation among slots and apply delays between host and backend queues of connection manager 560 to enforce priority.

Host interface 530 may include an interface protocol and/or set of functions and parameters for receiving, parsing, responding to, and otherwise managing requests from host nodes or systems. For example, host interface 530 may include functions for receiving and processing host requests for establishing host connections with one or more volumes or namespaces stored in storage devices for reading, writing, modifying, or otherwise manipulating data blocks and their respective client or host data and/or metadata in accordance with host communication and storage protocols. In some embodiments, host interface 530 may enable direct memory access and/or access over NVMe protocols, such as RDMA and TCP/IP access, through host bus interface 518 and storage bus interface 516 to host data units 520.1 stored in non-volatile memory devices 520. For example, host interface 530 may include host communication protocols compatible with ethernet and/or another host interface that supports use of NVMe and/or RDMA protocols for data access to host data 520.1. Host interface 530 may further include host communication protocols compatible with accessing storage node and/or host node resources, such as memory buffers, processor cores, queue pairs, and/or specialized assistance for computational tasks.

In some embodiments, host interface 530 may include a plurality of hardware and/or software modules configured to use processor 512 and memory 514 to handle or manage defined operations of host interface 530. For example, host interface 530 may include a storage interface protocol 532 configured to comply with the physical, transport, and storage application protocols supported by the host for communication over host bus interface 518 and/or storage bus interface 516. For example, host interface 530 may include a connection request handler 534 configured to receive and respond to host connection requests. For example, host interface 530 may include a host command handler 536 configured to receive host storage commands to a particular host connection. For example, host interface 530 may include a priority configuration interface 538 configured to receive priority allocations for one or more priority groups, such as namespace, host, or device priority groups. In some embodiments, host interface 530 may include additional modules (not shown) for command handling, buffer management, storage device management and reporting, and other host-side functions.

In some embodiments, storage interface protocol 532 may include both PCIe and NVMe compliant communication, command, and syntax functions, procedures, and data structures. In some embodiments, storage interface protocol 532 may include an NVMeoF or similar protocol supporting RDMA, transmission control protocol/internet protocol (TCP/IP), and/or other connections for communication between host nodes and target host data in non-volatile memory 520, such as volumes or namespaces mapped to the particular host. Storage interface protocol 532 may include interface definitions for receiving host connection requests and storage commands from the fabric network, as well as for providing responses to those requests and commands. In some embodiments, storage interface protocol 532 may assure that host interface 530 is compliant with host request, command, and response syntax while the backend of host interface 530 may be configured to interface with connection manager 560 to provide command forwarding between host command queues and backend command queues.

Connection request handler 534 may include interfaces, functions, parameters, and/or data structures for receiving host connection requests in accordance with storage interface protocol 532, determining an available processing queue, such as a queue-pair, allocating the host connection (and corresponding host connection identifier) to a storage device processing queue, and providing a response to the host, such as confirmation of the host storage connection or an error reporting that no processing queues are available. For example, connection request handler 534 may receive a storage connection request for a target namespace in a NVMe-oF storage array and provide an appropriate namespace storage connection and host response. To enable connection manager 560, connection request handler 534 may validate the incoming host connection request and then pass processing of the connection request to connection manager 560. Connection request handler 534 may then receive a response from connection manager 560 to provide back to the requesting host. In some embodiments, data describing each host connection request and/or resulting host connection may be stored in host connection log data 520.2. For example, connection request handler 534 may generate entries in a connection log table or similar data structure indexed by host connection identifiers and including corresponding namespace and other information.

In some embodiments, host command handler 536 may include interfaces, functions, parameters, and/or data structures to provide a function similar to connection request handler 534 for host storage commands directed to the host storage connections allocated through connection request handler 534. For example, once a host storage connection for a given namespace and host connection identifier is allocated to a backend queue-pair, the host may send any number of storage commands targeting data stored in that namespace. Host command handler 536 may include a direct interface to host queue pairs 536.1 for both command submission and a return path for completion. To enable connection manager 560, host command handler 536 may validate the incoming storage commands and then pass the host storage command to the corresponding submission queue for the connection in connection manager 560. Host command handler 536 may also maintain return paths for responses from the storage commands, such as corresponding completion queues in connection manager 560 for providing responses back to the correct host. In some embodiments, host queue pairs 536.1 and corresponding addressing may be maintained by host command handler 536 using host connection identifiers and connection log data 520.2.

In some embodiments, priority configuration interface 538 may include interfaces, functions, parameters, and/or data structures to provide a host or system administrator interface for configuring priority information, such as priority groups and priority allocations. For example, priority configuration interface 538 may include a command interface and/or support an application protocol interface (API) or graphical user interface to allow host systems and/or system administrators with appropriate credentials to configure priority lookup table 574 or a similar configuration data structure, such as a structured database, multi-dimensional array, configuration page or register, etc. In some configurations, priority configuration interface 538 may support definition of one or more priority groups, such as host priority groups, namespace priority groups, or storage device priority groups based on their respective identifiers and throttling engine 570 may map those groups to corresponding slot identifiers and resulting slot groups in storage node 500. Priority configuration interface 538 may also enable the user to define priority allocations for each of the defined priority groups. For example, priority configuration interface 538 may allow the user to allocate bandwidth percentages among the priority groups and/or define an ordinal priority from 1 to n for a strict priority configuration.

Storage interface 540 may include an interface protocol and/or set of functions and parameters for reading, writing, and deleting data units in corresponding storage devices. For example, storage interface 540 may include functions for executing host data operations related to host storage commands received through host interface 530 once a host connection is established. For example, PUT or write commands may be configured to write host data units to non-volatile memory devices 520. GET or read commands may be configured to read data from non-volatile memory devices 520. DELETE commands may be configured to delete data from non-volatile memory devices 520, or at least mark a data location for deletion until a future garbage collection or similar operation actually deletes the data or reallocates the physical storage location to another purpose.

In some embodiments, storage interface 540 may include a plurality of hardware and/or software modules configured to use processor 512 and memory 514 to handle or manage defined operations of storage interface 540. For example, storage interface 540 may include a storage interface protocol 542 configured to comply with the physical, transport, and storage application protocols supported by the storage devices for communication over storage bus interface 516, similar to or part of storage interface protocol 532. For example, storage interface 540 may include a storage device manager 544 configured to manage communications with the storage devices in compliance with storage interface protocol 542. For example, storage interface 540 may include or interface with a storage interface switch 546 configured to direct communication from host interface 530 and connection manager 560 to specific data storage devices for completion of host storage commands.

Storage device manager 544 may include interfaces, functions, parameters, and/or data structures to manage how host storage commands are sent to corresponding processing queues in the storage devices and responses are returned for the hosts. In some embodiments, storage device manager 544 may manage a plurality of storage devices, such as an array of storage devices in a storage node. For example, storage device manager 544 may be configured for a storage array of thirty-two SSDs, each SSD having a unique storage device identifier and configuration. Storage device manager 544 may be configured to manage any number of storage devices. In some embodiments, storage device manager 544 may include a data structure containing storage device identifiers 544.1 and configuration information for each storage device, such as slot/port and/or other addressing information, device type, capacity, number of supported queue-pairs, I/O queue depth, etc. In some embodiments, storage device manager 544 may include configuration information for backend queue pairs supported by the set of storage devices. For example, each storage device may be configured to support a defined number of queue pairs and namespaces and storage device manager 544 may provide that configuration information to connection manager 560 for allocating host connections.

Storage interface switch 546 may comprise a storage interface that supports a storage controller interface and provides a plurality of storage device interfaces through storage bus interface 516. For example, storage interface switch 546 may support incoming traffic across a 16 lane interface connection to the storage controller and support communication to 8, 16, 32, or more data storage devices, where each storage device us supported by two or more lanes. In some configurations, storage interface switch 546 may be configured as a PCIe switch configured to support access to any number of PCIe NVMe data storage devices from the processor system of the storage controller circuit. Storage interface switch 546 may be configured to support a slot configuration 546.1 corresponding to the number of interface ports for receiving the PCIe interface of a data storage device, such as an SSD. Storage interface switch 546 may also be configured to support a lane configuration 546.2 corresponding to the number of lanes used to support each slot. For example, a common lane configuration for supporting SSDs is two lanes configured as send and receive lanes respectively.

Connection manager 560 may include interface protocols and a set of functions, parameters, and/or data structures for managing the host connections through host interface 530 and storage interface 540. For example, connection manager 560 may receive and resolve host connection requests and related host storage commands by forwarding between host (frontend) queue-pairs and storage (backend) queue-pairs. Connection manager 560 may be configured to interface with throttling engine 570 to support the selective insertion of delays based on priority groups mapped to storage device slot assignments. Connection manager 560 may include hardware and/or software modules configured to use processor 512 and memory 514 for executing specific functions of connection manager 560. In some embodiments, connection manager 560 may include connection response logic 562, queue pair manager 564, storage command manager 566, and completion manager 568.

Connection response logic 562 may include interfaces, functions, parameters, and/or data structures configured to determine a response to host connection requests in support of connection request handler 534. In some embodiments, connection response logic 562 may be called by or integrated with connection request handler 534. Connection response logic 562 may identify or determine a host identifier 562.1 for identifying a particular host and a namespace identifier 562.2 for identifying a namespace in one of the data storage devices. Based on host identifier 562.1 and namespace identifier 562.2, connection manager 560 may generate or assign a host connection identifier for managing each unique host connections to namespaces in the storage devices. For example, connection response logic 562 may extract host identifier 562.1 and namespace identifier 562.2 from the host connection request and/or receive them from connection request handler 534 and/or connection log data 520.2. In some embodiments, the host connection identifier, host identifier 562.1 and namespace identifier 562.2 may then be passed to queue pair manager 564 for further processing of host connection requests.

Queue pair manager 564 may include interfaces, functions, parameters, and/or data structures configured to manage allocations of host or frontend queue-pairs represented by host connection identifiers to storage device or backend queue pairs represented by backend queue identifiers. In some embodiments, queue pair manager 564 may receive or identify each connection request received from the hosts. For example, queue pair manager 564 may receive connection requests from connection request handler 534, connection response logic 562, and/or connection log data 520.2. Queue pair manager 564 may determine a first memory space allocated to each host queue pair, including a host submission queue and a host completion queue, and a second memory space allocated to each backend queue pair, include a backend submission queue and a backend completion queue. For example, queue pair manager 564 may control access to a set of circular registers accessible through host direct memory access and a set of circular registers accessible through storage device direct memory access to allocate the respective host queue pairs and backend queue pairs.

Storage command manager 566 may include interfaces, functions, parameters, and/or data structures configured to manage allocation of individual storage commands to the processing queues and their respective completion connection identifiers. For example, host command handler 536 may pass storage commands to storage command manager 566 and/or they may be written by direct memory access to the corresponding host submission queue by the host system. Storage command manager 566 may include queue forwarding logic 566.1 configured to forward host storage commands received in the host submission queue to a corresponding backend submission queue for the storage device that will execute the storage command. For example, queue pair manager 564 may maintain a mapping of host submission queues to backend submission queues by host connection identifier in connection log data 520.2. and use the mapping of storage locations to copy the host storage command from the host submission queue to the backend completion queue. Storage command manager 566 may be configured to use throttling engine 570 to determine a delay to be inserted before forwarding each host storage command between queues. For example, storage command manager 566 may read a host storage command from the host submission queue and/or determine that a new storage command has been received in the host submission queue. Storage command manager 566 may include group/index logic 566.2 configured to determine a priority group to use as an index value for determining the delay handling of that command. For example, based on the host connection identifier, group/index logic 566.2 may determine a host identifier, namespace identifier, and/or storage device identifier corresponding to a priority group that may be passed to throttling engine 570 to determine the delay for that host storage command. Storage command manager 566 may include a delay interface 566.3 configured to pass the index value or a corresponding priority group identifier to throttling engine 570 and receive a delay determination from throttling engine 570. In some configurations, storage command manager 566 may send a delay request including the index value to throttling engine 570 and thereby initiate a delay for that storage command. Throttling engine 570 may hold the delay request until priority and/or resource allocations indicate that the storage command should be passed to the backend submission queue and, upon determination of priority for that storage command, may return a forwarding response to instruct storage command manager 566 to forward the host storage command using queue forwarding logic 566.1.

Completion manager 568 may include interfaces, functions, parameters, and/or data structures configured to manage handling completion notifications from the storage devices to the corresponding hosts. For example, completion manager 568 may receive, through the backend completion queue, storage device completion indicators for storage commands that have been processed. Completion manager 568 may then forward those completion indicators to the corresponding host completion queue through host command handler 536.

Throttling engine 570 may include interfaces, functions, parameters, and/or data structures configured to determine the delay for forwarding of host storage commands by storage command manager 566. For example, throttling engine 570 may be invoked by connection manager 560 when processing host storage commands to determine a delay to be applied between receiving the command in the host submission queue and forwarding the command to the backend submission queue. In some configurations, throttling engine 570 may include priority check logic 572 configured to determine whether the priority allocation feature is enabled for storage node 500. For example, a configuration data structure may include one or more parameters, such as a flag, for enabling priority allocation, and/or the configuration of priority lookup table 574 may indicate that priority allocation is enabled. If priority allocation is not enabled, delay interface 566.3 may be disabled and throttling engine 570 may not operate. Storage command manager 566 may operate by forwarding each host storage command as it is received without any delay.

In some embodiments, throttling engine 570 may use priority lookup table 574 to determine how host storage commands are prioritized and the delay for each command is determined. For example, priority lookup table 574 may comprise a data structure in priority table data 520.3 that includes a series of columns for defining slot groups, any corresponding priority groups, and priority allocations among those slot groups. Each entry in priority lookup table 574 may correspond to one or more priority values for the slot group, a set of slot identifiers for the slot group, and a set of identifiers corresponding to a priority group assigned to that slot group, if any. Priority allocation values 574.1 may include a series of priority values that allocate priority among the different slot groups. For example, slot groups may be allocated a percentage of a total operating bandwidth, where each slot group receives a portion of the bandwidth and the values add up to the total operating bandwidth being allocated. In another example, a strict priority may be based on ordinal classification of priorities providing a order of slot groups to be processed, such that all pending commands at priority value 1 are processed before any pending commands at priority value 2, which are processed before any pending commands at priority value 3, etc. Priority lookup table 574 may include at least a slot priority group 574.2 that allocates priority to sets of one or more slots. Because storage devices may be allocated to slots on a one-to-one basis, slot groups may also be managed as storage device priority groups, enabling a priority configuration that gives priority to specific storage devices, such as due to their processing, capacity, and/or endurance characteristics. In some configurations, namespace priority groups 574.3 may be configured that map sets of namespace identifiers to the slot groups that contain those storage devices and namespaces. This may enable configurations where specific namespaces are given priority to based on their support of mission critical applications or similar considerations. In some configurations, host priority groups 574.4 may be configured to map sets of host identifiers to the slot groups that contain the storage devices that support those host connections. In some configurations, priority configuration interface 538 may be used to configure priority lookup table 574. For example, storage node 500 may monitor host I/O traffic through host bus interface 518 and use host I/O traffic metrics (along with service level agreements or other resource prioritization schemes) to define priority groups and allocate priority values. Other priority allocation schemes and priority group definitions for accessing slot group priorities are possible.

Throttling engine 570 may include a delay manager 576 configured to determine the delay for each host storage command. For example, delay manager 576 may read priority lookup table 574 to determine the delay value for each host storage command. In some embodiments, delay manager 576 may include a token bucket engine 576.1 configured to implement a token bucket algorithm for generating and allocating tokens to prioritize the allocation of resources to different slot groups. For example, token bucket engine 576.1 may generate a set of tokens for each unit of operating time, such as an operating window, and include a cost credit manager 576.2 that allocates those tokens to various buckets corresponding to each slot group. Processing of a host storage command may be contingent on tokens being available in the corresponding token bucket for that slot group during an operating window in which the command is pending and forwarding of that command may be delayed until those conditions are met. The assignment of slot groups to buckets and the determination of the number of tokens allocated to each bucket may be determined from priority lookup table 574. In some configurations, tokens may also have a decay rate, buckets may have limits for the numbers of tokens they may contain, and/or buckets may be cleared by cost credit manager 576.2 each operating window. In some embodiments, delay manager 576 may include strict policy logic 576.3 based on ordinal priorities for one or more slot groups. For example, slot groups may be given an order for using their allocated tokens and/or some slot groups may be given infinite tokens in their bucket to enable all host commands received for that slot group to be processed ahead of slot groups with a lower priority and/or a percentage share of available bandwidth. In some embodiments, delay manager 576 may include operating window logic 576.4 configured to determine sets of pending host storage commands and, in some configurations, allocations of tokens by cost credit manager 576.2 for determining which commands in that set of pending commands should be forwarded (thus ending their delay period). For example, throttling engine 570 may operate on a fixed operating time cycle, such as 1 second operating windows, during which tokens are generated and allocated by token bucket engine 576.1 and used to determine a number of storage commands in each slot group that are processed during that time window, generally in a first-in-first-out order within each priority group. The use of token bucket engine 576.1 may allow delay manager 576 to make immediate decisions regarding the forwarding of a storage command when tokens are available for that slot, rather than having to wait for all pending storage commands for an operating window (such as by enforcing a minimum 1 cycle delay on all commands) to sequentially order all pending storage commands. Other mechanisms for calculating storage command delay based on one or more priority schemes are possible.

In some embodiments, throttling engine 570 may include an interface switch monitor 578 configured to monitor backend I/O traffic through storage interface switch 546. For example, interface switch monitor 578 may determine when storage commands are forwarded to a backend submission queue and sent through storage interface switch 546 to the corresponding storage device. Interface switch monitor 578 may also determine when storage responses are received from that storage device to the corresponding backend completion queue to determine the backend I/O traffic patterns and related metrics through storage interface switch 546. In some configurations, interface switch monitor 578 may quantify the traffic to and through each slot and provide those metrics to priority configuration interface 538 for determining slot groups and priority allocations among those slot groups.

Figure 6A:
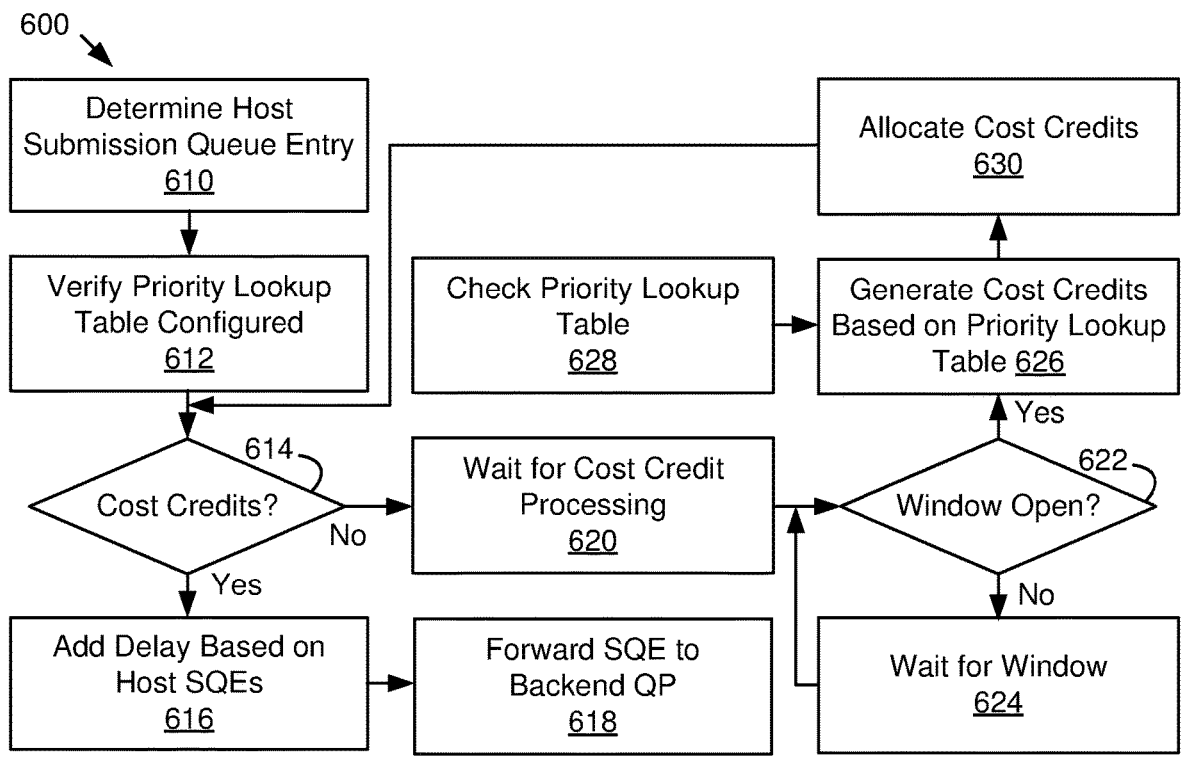
FIG. 6a is a flowchart of an example method of using a delay between a host submission queue and backend submission queue.

As shown in FIG. 6a, storage node 500 may be operated according to an example method for using a delay between a host submission queue and backend submission queue, i.e., according to method 600 illustrated by blocks 610-624 in FIG. 6a.

At block 610, host submission queue entry may be determined. For example, a host submission queue may receive a host storage command from a host system connected to that queue pair.

At block 612, a priority lookup table may be verified. For example, the storage controller may determine whether the priority lookup table is configured for prioritized delays based on a configuration flag and/or table contents.

At block 614, whether cost credits are available for that host storage command may be determined. For example, a throttling engine may check a token bucket allocated to the slot group corresponding to the host storage command to determine whether sufficient cost credits are present to forward the command. If sufficient credits or tokens are available, method 600 may proceed to block 616. If sufficient credits or tokens are not available, method 600 may proceed to block 620.

At block 616, a delay may be added based on the host submission queue entries. For example, a number of pending host storage commands for the same slot group may be processed in first-in-first-out order using the allocated tokens or credits, resulting in a delay for those later in the order.

At block 618, submission queue entries may be forwarded to the corresponding backend queue pair. For example, as credits or tokens are available and host storage commands are processed in order, they may be forwarded to the backend submission queue for processing by the corresponding storage device.

At block 620, cost credit processing may be waited for. For example, all host storage commands may be held and delayed when no cost credits are available and the throttling engine may wait for a next operating window and the refresh of tokens allocated to the various slot groups.

At block 622, whether or not the window is open may be evaluated. For example, the throttling engine may include a timer associated with operating window logic for measuring elapsed time until a next operating cycle. If the window is not open, then method 600 may proceed to block 624 to wait for the window to open and return to block 622. If the window is open, method 600 may proceed to block 626.

At block 626, cost credits may be generated based on a priority lookup table. For example, the throttling engine may check the priority lookup table at block 628 to determine the priority allocations across the slots groups and generate cost credits or tokens for the next operating window.

At block 630, cost credits may be allocated. For example, based on the priority allocations in the priority lookup table, sets of tokens corresponding to the priority values for each slot group may be allocated to the corresponding buckets of a token bucket engine and operation may return block 614.

Figure 6B:
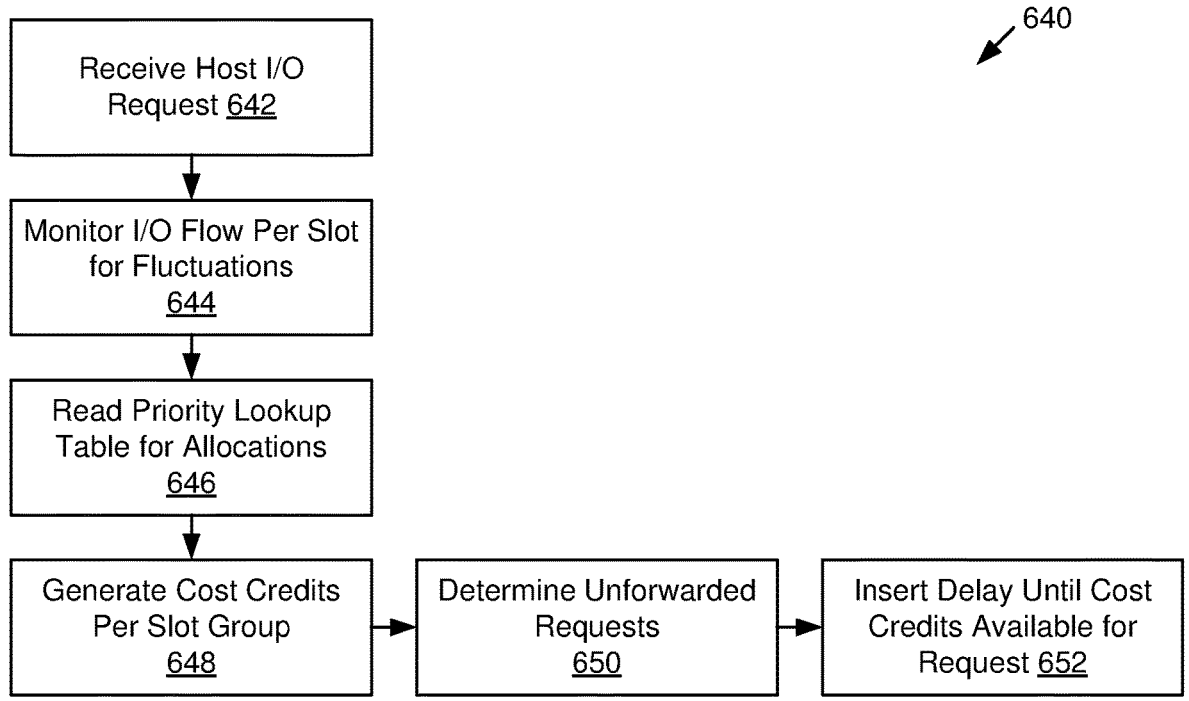

As shown in FIG. 6b, storage node 500 may be operated according to an example method for using a delay based on slot groups with the method of FIG. 6a, i.e., according to method 640 illustrated by blocks 642-652 in FIG. 6b.

At block 642, a host I/O request may be received. For example, the storage node may receive a host storage command directed to a host connection and corresponding host queue pair.

At block 644, I/O traffic flow per slot may be monitored for fluctuations. For example, the storage node may collect metrics on host storage commands that may be used for grouping slots and allocating priorities among slots.

At block 646, a priority lookup table may be read for allocations. For example, the storage node may include a throttling engine configured to use slot groups and priority allocations from the priority lookup table to determine delays for each command based on the slot to which it is connected.

At block 648, cost credits may be generated per slot group. For example, the throttling engine may use a token bucket algorithm based on generating cost credits or tokens based on a share of the switch bandwidth to be allocated to each slot group.

At block 650, unforwarded or pending host I/O requests may be determined. For example, the throttling engine may receive notification of host storage commands as they are received in host submission queues and in a forwarding pending state.

At block 652, a delay may be inserted until cost credits are available for the request. For example, the host storage command may remain in the host submission queue without being forwarded until the throttling engine determines that tokens are available in the bucket associated with that command's slot group, delaying the host storage command until credits are available.

Figure 6C:
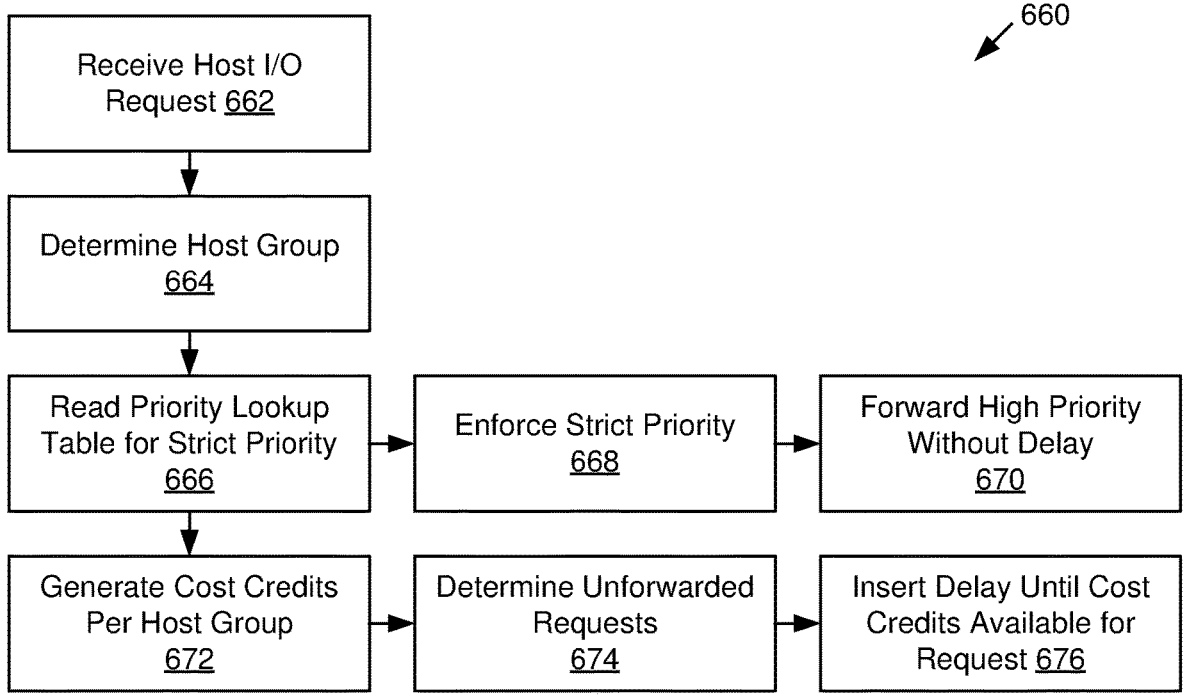

As shown in FIG. 6c, storage node 500 may be operated according to an example method for using a delay based on host groups and strict priority with the method of FIG. 6a, i.e., according to method 660 illustrated by blocks 662-676 in FIG. 6c.

At block 662, a host I/O request is received. For example, the storage node receives a host storage command to a host connection for a target namespace and corresponding storage device.

At block 664, a host priority group may be determined. For example, based on the host identifier associated with the host connection, the throttling engine may determine which host priority group the host storage command is associated with.

At block 666, a priority lookup table may be read for strict priority. For example, one or more host priority groups may receive strict priority over other host groups.

At block 668, strict priority may be enforced. For example, the host priority group for the host storage command may be determined to be the host group with highest priority in an ordinal priority scheme.

At block 670, high priority requests may be forwarded without delay. For example, the host storage command for the high priority host priority group may be immediately forwarded to the backend submission queue without checking for available credits or tokens.

At block 672, cost credits may be generated per host group. For example, the throttling engine may include a token bucket engine that manages tokens for allocating priority for host storage commands not in the strict priority host group or groups.

At block 674, unforwarded requests may be determined. For example, the throttling engine may aggregate pending host storage commands that have not yet been forwarded to their backend submission queues.

At block 676, a delay may be inserted until cost credits are available to process the request. For example, the throttling engine may delay each storage request until it is the next request for its assigned host group and tokens are available in that host priority group token bucket, then instruct the connection manager to forward the host storage command to the backend submission queue.

Figure 6D:
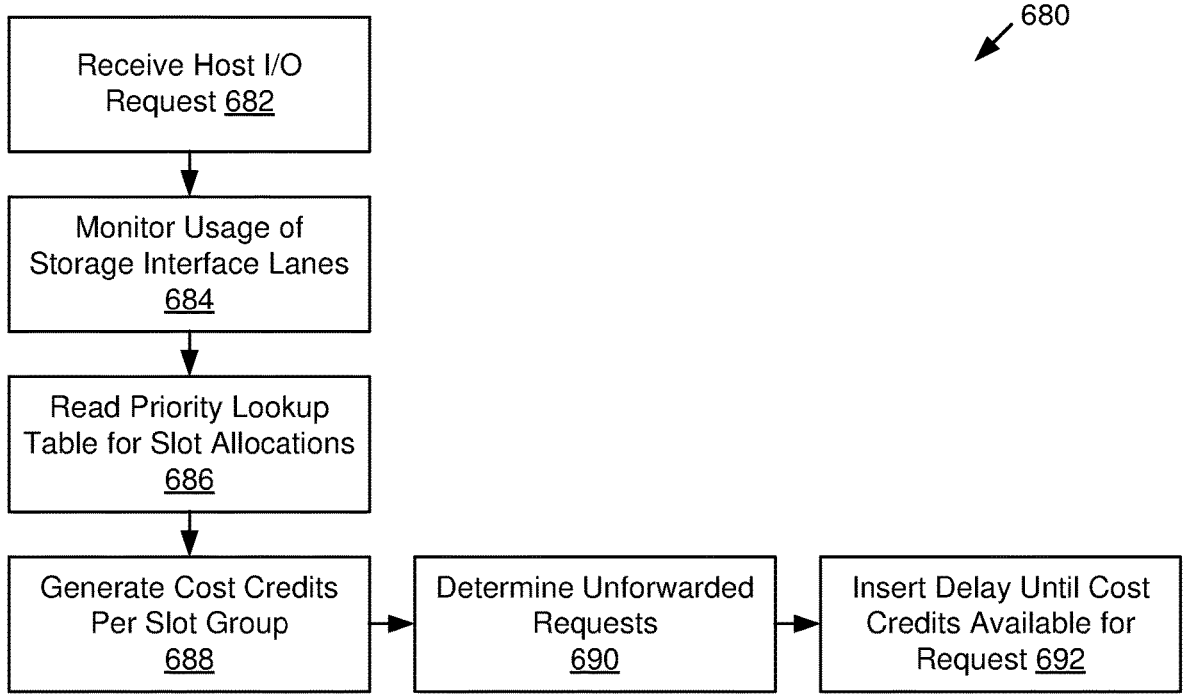

As shown in FIG. 6d, storage node 500 may be operated according to an example method for using a delay based on monitoring storage interface lanes with the method of FIG. 6a, i.e., according to method 680 illustrated by blocks 682-692 in FIG. 6d.

At block 682, a host I/O request is received. For example, the storage node receives a host storage command to a host connection for a target namespace and corresponding storage device.

At block 684, usage of storage interface lanes may be monitored. For example, the throttling engine may monitor traffic through a storage interface switch to determine relative usage of lanes across all slots.

At block 686, a priority lookup table may be read for slot allocations. For example, based on the lane traffic metrics, the priority lookup table may be configured with slot groups that group sets of slots according to their usage.

At block 688, cost credits may be generated per slot group. For example, the throttling engine may include a token bucket engine that manages tokens for allocating priority for host storage commands among slot priority groups from the priority lookup table.

At block 690, unforwarded requests may be determined. For example, the throttling engine may aggregate pending host storage commands that have not yet been forwarded to their backend submission queues.

At block 692, a delay may be inserted until cost credits are available to process the request. For example, the throttling engine may delay each storage request until it is the next request for its assigned slot group and tokens are available in that slot priority group token bucket, then instruct the connection manager to forward the host storage command to the backend submission queue.

Figure 7:
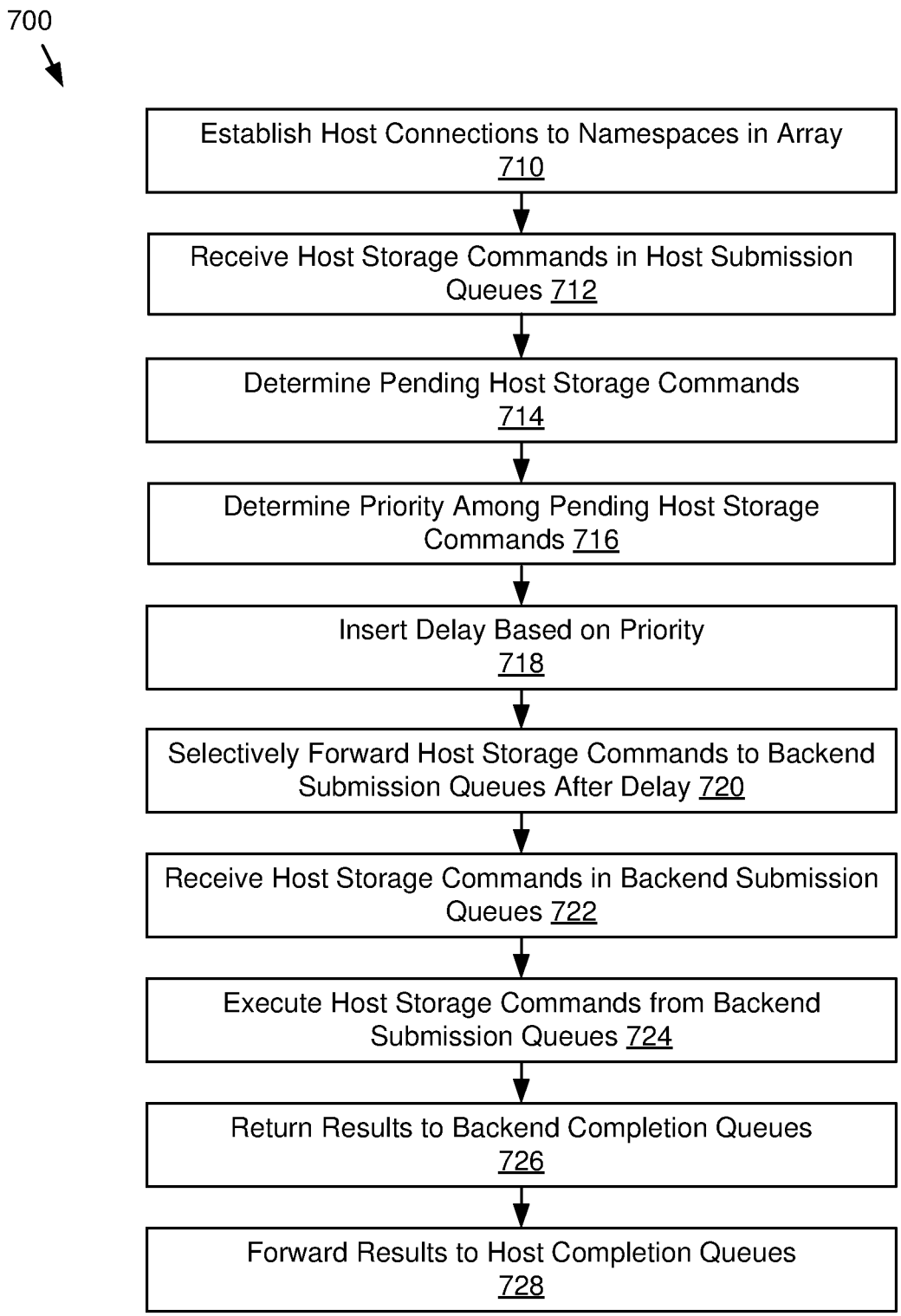
FIG. 7 is a flowchart of an example method of dynamically allocating host storage commands by inserting a delay between host and backend submission queues.

As shown in FIG. 7, storage node 500 may be operated according to an example method for dynamically allocating host storage commands by inserting a delay between host and backend submission queues, i.e., according to method 700 illustrated by blocks 710-740 in FIG. 7.

At block 710, host connections may be established to namespaces in a storage device array. For example, a plurality of hosts may request and receive host connections to particular namespaces through host queue pairs and backend queue pairs allocated by the storage controller.

At block 712, host storage commands may be received in host submission queues. For example, the host systems may write host storage commands to the host submission queues for their host connections and those host submission queues may receive those commands.

At block 714, pending host storage commands may be determined. For example, during an operating window, a throttling engine may determine host storage commands that have been received in host submission queues bur are pending forwarding to backend submission queues.

At block 716, priority may be determined among the pending host storage commands. For example, the throttling engine may group the pending host storage commands into priority groups for determining their relative priority across the different priority groups.

At block 718, a delay may be inserted based on the priority for that priority group. For example, based on the priority group to which the command is assigned and the number of pending commands in that group, the host storage command may be held for a delay period by the throttling engine.

At block 720, host storage commands may be selectively forwarded to backend submission queues after their corresponding delay. For example, when the throttling engine determines that a command has priority, it may release the delay and a connection manager may forward the host storage command from the host submission queue to the corresponding backend submission queue for that host connection.

At block 722, host storage commands may be received in backend submission queues. For example, the connection manager may write the forwarded host storage commands in the corresponding backend submission queue for access by the corresponding data storage device.

At block 724, host storage commands may be executed from the backend submission queues. For example, the corresponding storage devices may select the next command in their backend submission queues for processing the corresponding storage operation.

At block 726, results may be returned to the backend completion queue. For example, the storage device may return a completion message or other status information to the backend completion queue corresponding to that host connection.

At block 728, results may be forwarded to the host completion queues. For example, the connection manager may forward the completion message from the backend completion queue to the corresponding host completion queue for that host connection.

Figure 8:
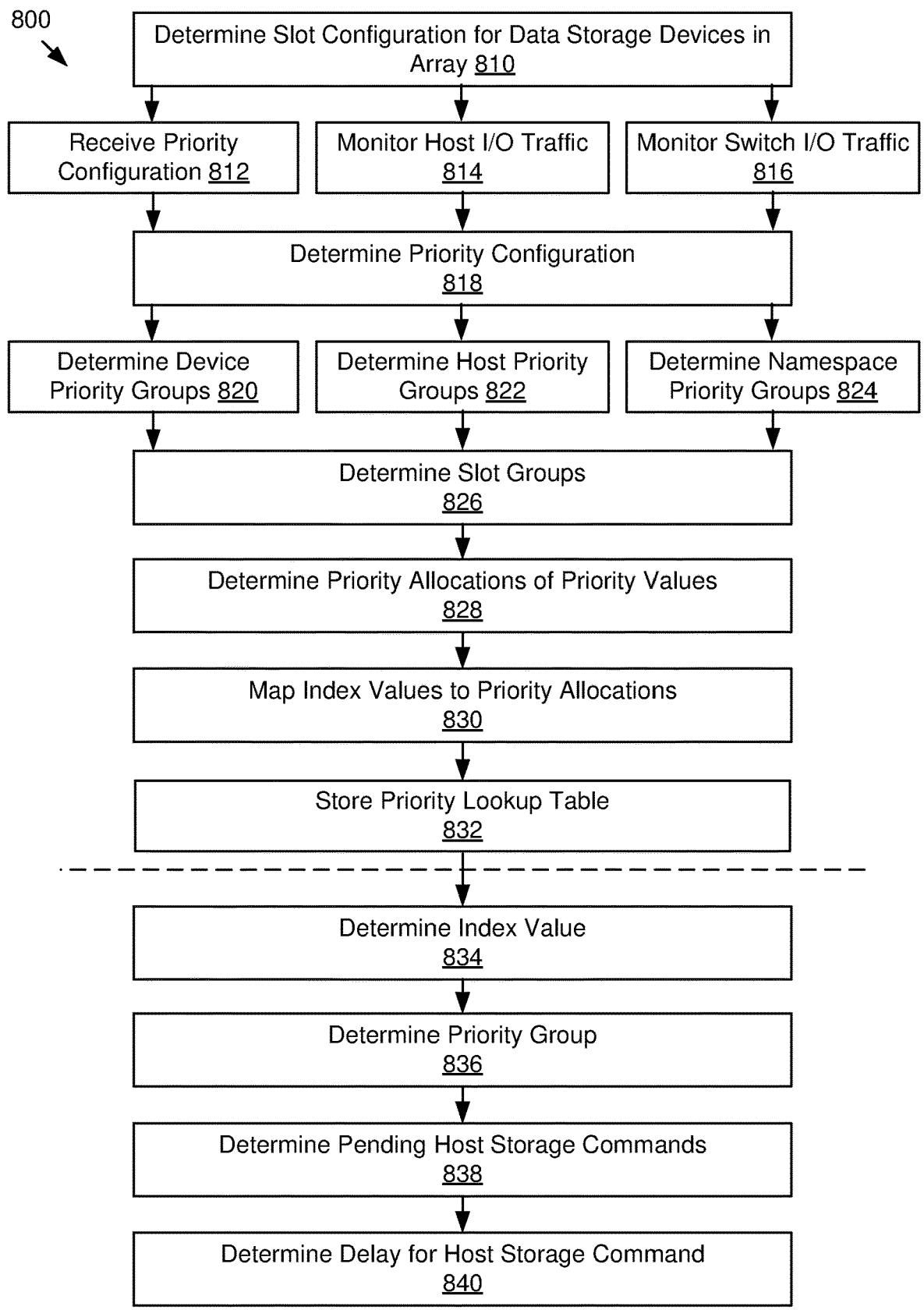
FIG. 8 is a flowchart of an example method of using slot configuration to configure and use a priority lookup table for determining command delay.

As shown in FIG. 8, storage node 500 may be operated according to an example method for using slot configuration to configure and use a priority lookup table for determining command delay, i.e., according to method 800 illustrated by blocks 810-840 in FIG. 8.

At block 810, a slot configuration may be determined for data storage devices in a storage device array. For example, the storage device array may include a plurality of data storage devices inserted in a corresponding number of slots that provide a storage interface connection to that storage device, resulting in a number of physical slot identifiers and a corresponding number of storage device identifiers associated with the slots on a one-to-one basis.

At block 812, a priority configuration may be received. For example, a host interface may enable a system administrator to receive priority group identifiers, such as sets of identifiers to be assigned to different priority groups, depending on the type of priority groups being used.

At block 814, host I/O traffic may be monitored. For example, a throttling engine may monitor host storage commands received by the array to collect comparative usage metrics that may be used in a load balancing algorithm for automatically determining priority configuration or may be provided through an interface for use by the system administrator in determining the priority configuration.

At block 816, switch I/O traffic may be monitored. For example, the throttling engine may monitor host storage commands sent through a storage interface switch to the slots of the storage devices to collect lane traffic metrics that may be used in a load balancing algorithm for automatically determining priority configuration or may be provided through an interface for use by the system administrator in determining the priority configuration.

At block 818, a priority configuration may be determined. For example, the system or a system administrator may select among priority group types to use for priority configuration in blocks 820-824.

At block 820, device priority groups may be determined. For example, the system or system administrator may select sets of storage devices that should be given the same priority based on storage device processing speed, capacity, and/or endurance characteristics.

At block 822, host priority groups may be determined. For example, the system or system administrator may select sets of host systems that should be given the same priority based on service level agreements, critical applications, or other considerations.

At block 824, namespace priority groups may be determined. For example, the system or system administrator may select sets of namespaces that should be given the same priority based on the applications those namespaces support.

At block 826, slot groups may be determined. For example, the system may map the priority groups determined at blocks 820-824 to the storage devices and corresponding slots that support those groups and add the slot groups to the priority lookup table.

At block 828, priority allocations may be determined to assign priority values to each priority group. For example, the system or system administrator may determine percentage allocations of the available bandwidth to be allocated to each priority group and/or may order the priority groups using an ordinal scheme for strict priority, and add priority values for the priority allocations to the priority lookup able.

At block 830, index values may be mapped to the priority allocations. For example, the priority allocations and corresponding slot groups may be mapped to corresponding storage device identifiers, host identifiers, namespace identifiers, and/or host connection identifiers and added to the priority lookup table for indexing the slot group and corresponding priority allocations for each host storage command that is processed.

At block 832, the priority lookup table may be stored. For example, the system may store the priority lookup table in memory accessible to the storage controller for managing each storage command received by the array. Use of the stored priority lookup table for processing subsequent host storage commands is described with regard to blocks 834-840.

At block 834, an index value may be determined. For example, a throttling engine may determine an index value based on the selected type of priority group being used, such as the backend storage device identifier, namespace identifier, host identifier, and/or host connection identifier associating these values.

At block 836, a priority group may be determined. For example, based on the index value, the throttling engine may determine which priority group and correspondent slot group the host storage command is associated with.

At block 838, pending host storage commands may be determined. For example, the new host storage command may be added to the pending host storage commands for that priority group.

At block 840, a delay may be determined for the host storage command. For example, the number of pending host storage commands and priority value for that priority group may determine when the new host storage command will be forwarded to the backend submission queue.

Figure 9:
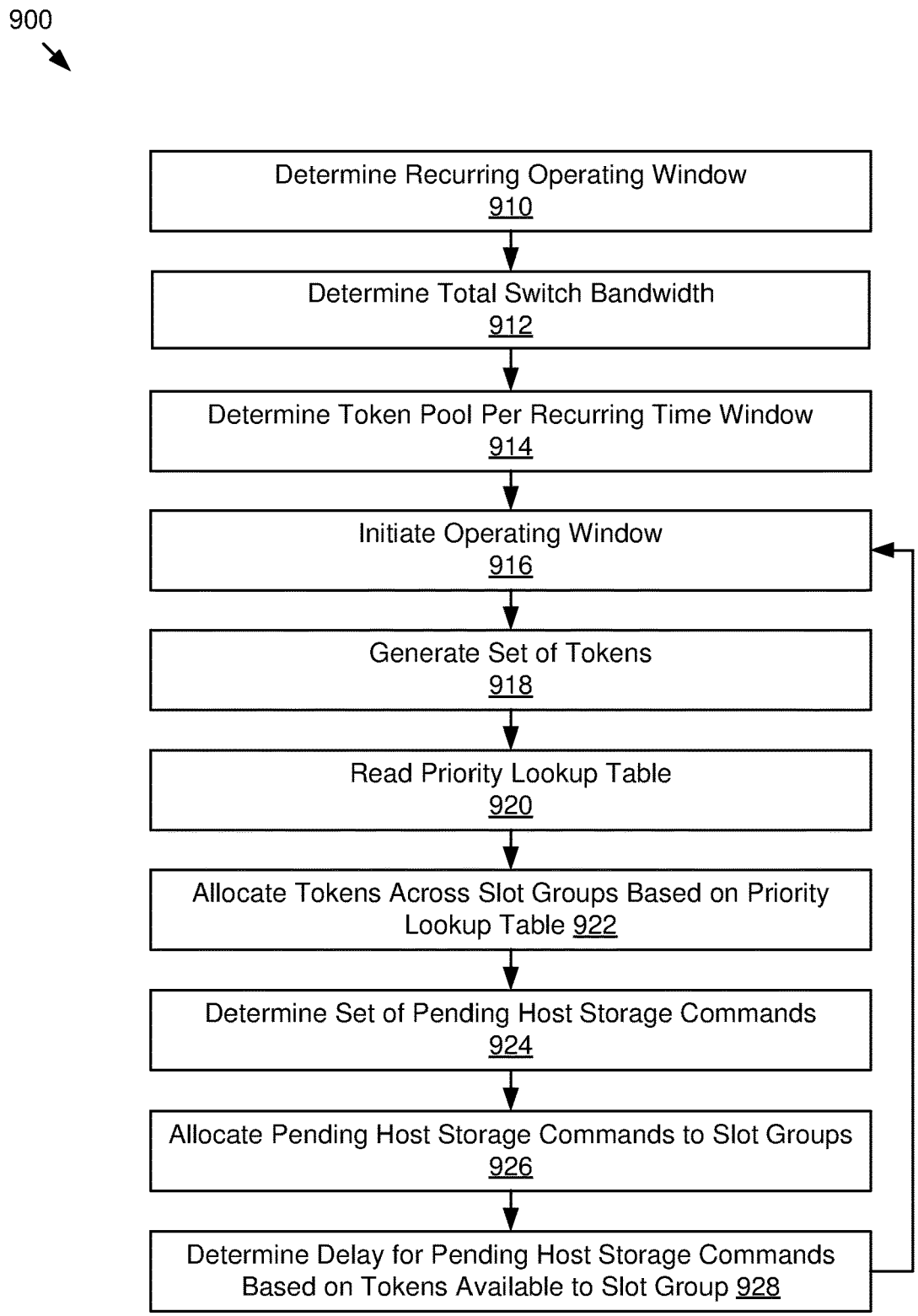
FIG. 9 is a flowchart of an example method of using a token bucket engine to manage delay determination across slot groups.

As shown in FIG. 9, storage node 500 may be operated according to an example method for using a token bucket engine to manage delay determination across slot groups, i.e., according to method 900 illustrated by blocks 910-928 in FIG. 9.

At block 910, a recurring operating window may be determined. For example, a throttling engine may operate on a recurring cycle for using and replenishing tokens in token buckets for the various slot groups.

At block 912, a total switch bandwidth may be determined. For example, the throttling engine may monitor I/O traffic through the storage interface switch to determine a number of commands that can be processed through the switch per unit time.

At block 914, a token pool may be determined per recurring operating window. For example, the number of commands determined at block 912 may be converted into a number of tokens for managing the commands forwarded during each recurring operating window.

At block 916, an operating window may be initiated. For example, the throttling engine may include a timer for monitoring elapsed time and initiating a new operating window at time-based intervals.

At block 918, a set of tokens may be generated. For example, the throttling engine may generate the number of tokens for the token pool determined at block 914.

At block 920, a priority lookup table may be read. For example, the throttling engine may access the priority allocations from the priority access table.

At block 922, tokens may be allocated across slot groups based on the priority lookup table. For example, based on the priority value assigned in the priority access table for each slot group, the throttling engine may allocate a portion, such as a percentage, to a token bucket for each slot group.

At block 924, a set of pending host storage commands may be determined. For example, as host storage commands are received at host submission queues during the operating window, the throttling engine may aggregate them.

At block 926, pending host storage commands may be allocated to slot groups. For example, based on the priority group the command belongs to, the throttling engine may aggregate separate queues of pending host storage commands for each slot group.

At block 928, a delay for pending host storage commands may be determined based on the tokens available for that slot group. For example, the throttling engine may process the pending storage commands in each slot group based on their priority and determine whether tokens are available in the corresponding bucket for processing the next command in that group. If so, the delay may end and that command may be forwarded to the backend submission queue, otherwise the delay may continue until tokens are available, such as a next operating cycle. Method 900 may return to block 916 for a next cycle of the recurring operating window.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:
   at least one memory;
   a storage interface switch configured to communicate with a plurality of data storage devices;

a host interface configured to communicate with a plurality of host devices; and
at least one processor configured to, alone or in combination:
receive, though the host interface, host storage commands to a plurality of host submission queues allocated to a plurality of host connections for a plurality of namespaces allocated in the plurality of data storage devices;
forward the host storage commands to a plurality of backend submission queues for the corresponding namespaces of the plurality of namespaces;
determine priority among a set of pending host storage commands received to host submission queues; and
insert, prior to forwarding a pending host storage command from the set of pending host storage commands, a delay based on the priority.

2. The system of claim 1, further comprising:
a priority lookup data structure configured to map a set of index values to a corresponding set of priority allocations, wherein the at least one processor is further configured to, alone or in combination:
determine, for each host storage command in the set of pending host storage commands, a corresponding index value from the set of index values; and
determine, based on the corresponding index value for each host storage command in the set of pending host storage commands, the delay for that host storage command.

3. The system of claim 2, wherein:
each data storage device of the plurality of data storage devices is configured to connect to the storage interface switch through a corresponding slot of a plurality of slots;
the set of index values corresponds to a set of slot groups;
each slot of the plurality of slots is allocated to a slot group from the set of slot groups; and
the priority lookup data structure is further configured to map each slot group in the set of slot groups to a priority value for that slot group from the corresponding set of priority allocations.

4. The system of claim 3, wherein mapping each slot group in the set of slot groups comprises mapping each slot group to a priority group selected from:
a plurality of host priority groups for the plurality of host devices and corresponding to groups of host identifiers assigned to different priority levels;
a plurality of namespace priority groups for the plurality of namespaces and corresponding to groups of namespace identifiers assigned to different priority levels; or
a plurality of data storage device priority groups for the plurality of data storage devices and corresponding to groups of data storage device identifiers assigned to different priority levels.

5. The system of claim 3, wherein:
the priority values for the set of slot groups each allocate a portion of a total bandwidth value of host storage commands to be processed;
a sum of the priority values for the set of slot groups equals a total bandwidth value; and
the at least one processor is further configured to, alone or in combination, determine the delay for each host storage command based on the priority value and a number of pending host storage commands corresponding to that slot group.

6. The system of claim 3, wherein:
the priority values for the set of slot groups each allocate that slot group to an ordinal priority; and
the at least one processor is further configured to, alone or in combination, determine the delay for each host storage command based on the priority value and a number of pending host storage operations corresponding to that slot group and any slot group with a higher priority value.

7. The system of claim 3, wherein:
each slot of the plurality of slots is configured to receive host storage commands through a corresponding set of lanes for that slot; and
the at least one processor is further configured to, alone or in combination,
monitor lane input/output traffic between the storage interface switch and the plurality of data storage devices; and
determine, based on the lane traffic, the priority value for each slot group.

8. The system of claim 3, wherein the at least one processor is further configured to, alone or in combination:
monitor host input/output traffic between the plurality of host devices and the plurality of host submission queues; and
determine, based on the host input/output traffic, the priority value for each slot group.

9. The system of claim 1, wherein the at least one processor is further configured to, alone or in combination:
determine a recurring operating window for determining the set of pending host storage commands; and
determine the delay for each pending host storage command of the set of pending host storage commands for each cycle of the recurring operating window.

10. The system of claim 9, wherein:
each data storage device of the plurality of data storage devices is configured to connect to the storage interface switch through a corresponding slot of a plurality of slots; and
the at least one processor is further configured to, alone or in combination:
generate a set of tokens for each cycle of the recurring operating window;
allocate, based on the priority of each slot group of a set of slot groups for the plurality of slots, the set of tokens across the set of slot groups; and
determine, based on the set of pending host storage commands and tokens available for a corresponding slot group from the set of slot groups, the delay for each pending host storage command.

11. A computer-implemented method, comprising:
receiving, though a host interface, host storage commands to a plurality of host submission queues allocated to a plurality of host connections for a plurality of namespaces allocated in a plurality of data storage devices;
forwarding the host storage commands to a plurality of backend submission queues for the corresponding namespaces of the plurality of namespaces, wherein the plurality of data storage devices is accessed through a storage interface switch;
determining priority among a set of pending host storage commands received to host submission queues;
inserting, prior to forwarding a pending host storage command from the set of pending host storage commands, a delay based on the priority; and executing, from the plurality of backend submission queues, the host storage commands using the plurality of data storage devices.

12. The computer-implemented method of claim 11, further comprising:
mapping, using a priority lookup data structure, a set of index values to a corresponding set of priority allocations;
determining, for each host storage command in the set of pending host storage commands, a corresponding index value from the set of index values; and
determining, based on the corresponding index value for each host storage command in the set of pending host storage commands, the delay for that host storage command.

13. The computer-implemented method of claim 12, further comprising:
mapping, by the priority lookup data structure, each slot group in a set of slot groups to a priority value for that slot group from the corresponding set of priority allocations, wherein:
each data storage device of the plurality of data storage devices is configured to connect to the storage interface switch through a corresponding slot of a plurality of slots;
the set of index values corresponds to the set of slot groups; and
each slot of the plurality of slots is allocated to a slot group from the set of slot groups.

14. The computer-implemented method of claim 13, further comprising:
determining the delay for each host storage command based on the priority value and a number of pending host storage commands corresponding to that slot group, wherein:
the priority values for the set of slot groups each allocate a portion of a total bandwidth value of host storage commands to be processed; and
a sum of the priority values for the set of slot groups equals a total bandwidth value.

15. The computer-implemented method of claim 13, further comprising:
determining the delay for each host storage command based on the priority value and a number of pending host storage operations corresponding to that slot group and any slot group with a higher priority value, wherein the priority values for the set of slot groups each allocate that slot group to an ordinal priority.

16. The computer-implemented method of claim 13, further comprising:
monitoring lane input/output traffic between the storage interface switch and the plurality of data storage devices, wherein each slot of the plurality of slots is configured to receive corresponding host storage commands through a corresponding set of lanes for that slot; and
determining, based on the lane input/output traffic, the priority value for each slot group.

17. The computer-implemented method of claim 13, further comprising:
monitoring host input/output traffic between host devices and the plurality of host submission queues; and
determining, based on the host input/output traffic, the priority value for each slot group.

18. The computer-implemented method of claim 11, further comprising:
determining a recurring operating window for determining the set of pending host storage commands; and
determining the delay for each pending host storage command of the set of pending host storage commands for each cycle of the recurring operating window.

19. The computer-implemented method of claim 18, further comprising:
generating a set of tokens for each cycle of the recurring operating window, wherein each data storage device of the plurality of data storage devices is configured to connect to the storage interface switch through a corresponding slot of a plurality of slots;
allocating, based on the priority of each slot group of a set of slot groups for the plurality of slots, the set of tokens across the set of slot groups; and
determining, based on the set of pending host storage commands and tokens available for a corresponding slot group from the set of slot groups, the delay for each pending host storage command.

20. A storage system comprising:
at least one processor;
at least one memory;
a plurality of data storage devices;
a storage interface switch configured to communicate with the plurality of data storage devices;
a host interface configured to communicate with a plurality of host devices;
means for receiving, though the host interface, host storage commands to a plurality of host submission queues allocated to a plurality of host connections for a plurality of namespaces allocated in the plurality of data storage devices;
means for forwarding the host storage commands to a plurality of backend submission queues for the corresponding namespaces of the plurality of namespaces;
means for determining priority among a set of pending host storage commands received to host submission queues;
means for inserting, prior to forwarding a pending host storage command from the set of pending host storage commands, a delay based on the priority; and
means for executing, from the plurality of backend submission queues, the host storage commands using the plurality of data storage devices.

* * * * *